US 9,100,519 B2

(12) United States Patent
Kawamoto et al.

(10) Patent No.: US 9,100,519 B2
(45) Date of Patent: Aug. 4, 2015

(54) DATA PROCESSING APPARATUS, CONTENT DISPLAYING METHOD, AND NON-TRANSITORY COMPUTER-READABLE RECORDING MEDIUM ENCODED WITH BROWSING PROGRAM

(71) Applicant: Konica Minolta, Inc., Chiyoda-ku (JP)

(72) Inventors: Masayuki Kawamoto, Amagasaki (JP); Ayumi Itoh, Takarazuka (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 27 days.

(21) Appl. No.: 14/090,410

(22) Filed: Nov. 26, 2013

(65) Prior Publication Data

US 2014/0160046 A1  Jun. 12, 2014

(30) Foreign Application Priority Data

Nov. 28, 2012 (JP) ................................. 2012-260149

(51) Int. Cl.
*G06F 3/12* (2006.01)
*H04N 1/00* (2006.01)
*H04N 1/387* (2006.01)
*G06K 15/00* (2006.01)

(52) U.S. Cl.
CPC ......... *H04N 1/00411* (2013.01); *H04N 1/0044* (2013.01); *H04N 1/00469* (2013.01); *H04N 1/387* (2013.01); *H04N 2201/0094* (2013.01)

(58) Field of Classification Search
CPC .............................................. H04N 1/00469
See application file for complete search history.

(56) References Cited

U.S. PATENT DOCUMENTS

| 7,009,626 B2 | 3/2006 | Anwar |
| 7,055,095 B1 | 5/2006 | Anwar |

(Continued)

FOREIGN PATENT DOCUMENTS

| JP | 05-019743 A | 1/1993 |
| JP | 2006-343846 | 12/2006 |
| JP | 4964386 B2 | 6/2012 |

OTHER PUBLICATIONS

Office Action (Notice of Ground of Rejection) issued on Oct. 21, 2014, by the Japanese Patent Office in corresponding Japanese Patent Application No. 2012-260149 and an English translation of the Office Action. (7 pgs).

(Continued)

*Primary Examiner* — Dov Popovici
(74) *Attorney, Agent, or Firm* — Buchanan Ingersoll & Rooney PC

(57) ABSTRACT

A data processing apparatus includes a browsing portion to display a display area of content on a display portion, and a gesture event determining portion to determine a gesture event on the basis of position(s) designated by a user on a display surface of the display portion. The browsing portion includes a display area determining portion to determine a display area on the basis of the gesture event, a capture area determining portion to determine a capture area including the display area, a captured image generating portion to generate a captured image corresponding to the capture area on the basis of the content, a temporary memory control portion to temporarily store the captured image, a display image generating portion to generate a display image corresponding to the display area on the basis of the captured image, and a display control portion to display the display image on the display portion.

19 Claims, 16 Drawing Sheets

(56) References Cited

U.S. PATENT DOCUMENTS

| | | | |
|---|---|---|---|
| 2011/0013049 A1* | 1/2011 | Thorn | 348/240.3 |
| 2011/0037692 A1* | 2/2011 | Mimura | 345/156 |
| 2013/0031516 A1* | 1/2013 | Sawayanagi et al. | 715/863 |
| 2013/0318482 A1* | 11/2013 | Isensee et al. | 715/863 |
| 2014/0225870 A1* | 8/2014 | Fujikawa et al. | 345/175 |

OTHER PUBLICATIONS

Notice of Ground of Rejection issued in corresponding Japanese Patent Application No. 2012-260149, mailed Jun. 2, 2015, and English translation thereof.

* cited by examiner

F I G. 4
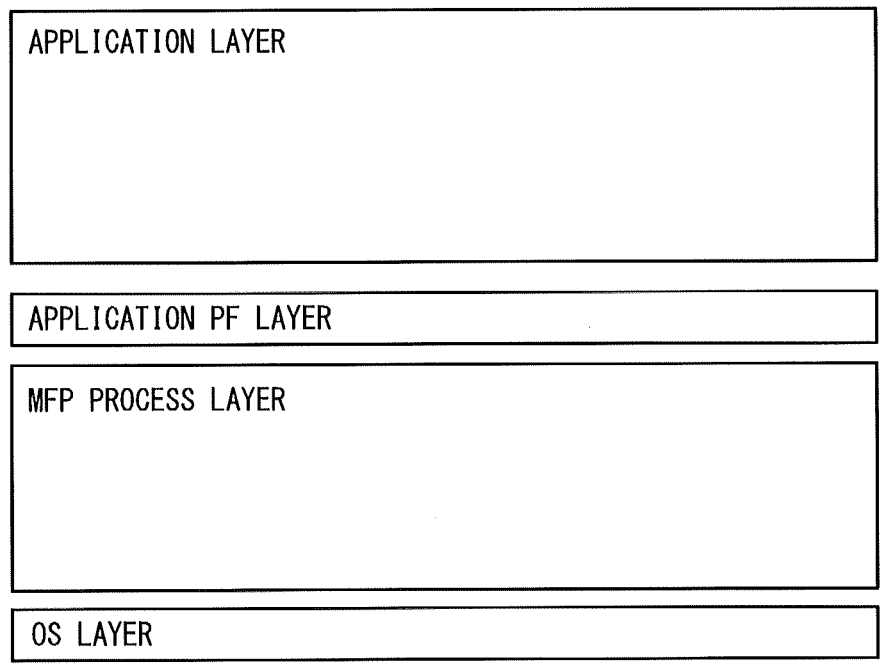

F I G. 6

MASTER TABLE      91

| PROCESS | GESTURE |
|---|---|
| PAGE TURNING | SWIPE |
| ENLARGEMENT | PINCH OUT |
| REDUCTION | PINCH IN |
| ROTATION | ROTATION |
| SCROLL | FLICK |
| SELECT CONTENT | DOUBLE TAP |

F I G. 1 1
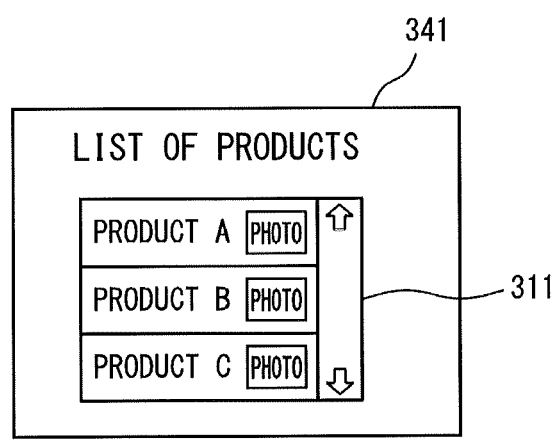

DATA PROCESSING APPARATUS, CONTENT DISPLAYING METHOD, AND NON-TRANSITORY COMPUTER-READABLE RECORDING MEDIUM ENCODED WITH BROWSING PROGRAM

This application is based on Japanese Patent Application No. 2012-260149 filed with Japan Patent Office on Nov. 28, 2012, the entire content of which is hereby incorporated by reference.

BACKGROUND OF THE INVENTION

1. Field of the Invention

The present invention relates to a data processing apparatus, a content displaying method, and a non-transitory computer-readable recording medium encoded with a browsing program. More particularly, the present invention relates to a data processing apparatus provided with a touch panel, a content displaying method performed by the data processing apparatus, and a non-transitory computer-readable recording medium encoded with a browsing program for causing a computer to perform the content displaying method.

2. Description of the Related Art

Some recent data processing apparatuses, typified by multi-function peripherals (MFPs), are provided with a touch panel as a user interface. The touch panel can detect a user operation of moving a position designated by the user. During the user operation of moving the designated position, however, the content of the designation changes in accordance with the movement of the position designated by the user. For example, a user designation of zooming in on an image includes a pinch-out operation in which two different locations are designated simultaneously with two fingers and the spacing between the two fingers is increased over time. When a scaling factor is determined in accordance with the spacing between the two fingers in the pinch-out operation, the scaling factor will vary while the user is inputting the pinch-out operation. Therefore, in the process of zooming in on an image, a new image needs to be displayed each time the scaling factor is changed.

U.S. Pat. No. 7,009,626 describes the following technique. For changing a size of an image of source data which is being displayed, the size of the image being displayed is changed, and the image being displayed is replaced with an image which has been changed in size. Thereafter, an image of the changed size is generated from the source data, and the image being displayed is replaced with the image generated from the source data.

Although the conventional technique can display the image of the changed size quickly when the entire image is being displayed, it cannot quickly display the image of the changed size when only a part of the image is being displayed. More specifically, in the case of reducing the size of the image being displayed, an area not being displayed will have to be displayed. In order to display the area not being displayed, an image of the size corresponding to the changed size will have to be generated from the source data. Therefore, it takes time to display the image of the changed size.

SUMMARY OF THE INVENTION

An aspect of the present invention provides a data processing apparatus including a display portion capable of displaying an image, a position detecting portion capable of detecting one or more positions designated by a user on a display surface of the display portion, and a control portion, wherein the control portion includes: a browsing portion to execute a browsing program and display on the display portion a display area which is at least a part of externally stored content; and a gesture event determining portion operable, in response to detection of one or more positions by the position detecting portion, to determine one of a plurality of gesture events on the basis of the one or more positions; wherein the browsing portion includes a display area determining portion to determine the display area on the basis of the gesture event determined by the gesture event determining portion, a capture area determining portion to determine a capture area including the display area determined by the display area determining portion, a captured image generating portion operable, in response to determination of the capture area, to generate a captured image corresponding to the determined capture area on the basis of the externally stored content, a temporary memory control portion to temporarily store the generated captured image, a display image generating portion to generate a display image corresponding to the determined display area on the basis of the temporarily stored captured image, and a display control portion to display the generated display image on the display portion.

Another aspect of the present invention provides a data processing apparatus including a display portion capable of displaying an image, a position detecting portion capable of detecting one or more positions designated by a user on a display surface of the display portion, and a control portion, wherein the control portion includes: a browsing portion to execute a browsing program and display on the display portion a display area which is at least a part of externally stored content; and a gesture event determining portion operable, in response to detection of one or more positions by the position detecting portion, to determine one of a plurality of gesture events on the basis of the one or more positions; wherein the browsing portion includes a display area determining portion to determine the display area on the basis of the gesture event determined by the gesture event determining portion, a capture area determining portion operable, at a time point prior to acquisition of a part of the externally stored content, to determine a capture area including the display area determined by the display area determining portion, a captured image acquiring portion operable, in response to determination of the capture area, to acquire a captured image corresponding to the determined capture area from the externally stored content, a temporary memory control portion to temporarily store the acquired captured image, a display image generating portion operable, during a gesture period in which gesture events are determined continuously by the gesture event determining portion, to generate a display image corresponding to the determined display area on the basis of the temporarily stored captured image, and a display control portion to display the generated display image on the display portion.

A further aspect of the present invention provides a content displaying method performed by a data processing apparatus, the data processing apparatus including a display portion capable of displaying an image, a position detecting portion capable of detecting one or more positions designated by a user on a display surface of the display portion, and a gesture event determining portion operable, in response to detection of one or more positions by the position detecting portion, to determine one of a plurality of gesture events on the basis of the one or more positions, wherein the method causes the data processing apparatus to perform a browsing step of executing a browsing program, acquiring content from the outside, and displaying on the display portion an image of a display area which is at least a part of the acquired content, wherein the browsing step includes a display area determining step of determining the display area on the basis of the gesture event determined by the gesture event determining portion, a capture area determining step of determining a capture area including the display area determined in the display area determining step, a captured image generating step of, in response to determination of the capture area, generating a captured image corresponding to the determined capture area on the basis of the acquired content, a temporary memory control step of temporarily storing the generated captured image, a display image generating step of generating a display image corresponding to the determined display area on the basis of the temporarily stored captured image, and a display control step of displaying the generated display image on the display portion.

A still further aspect of the present invention provides a content displaying method performed by a data processing apparatus, the data processing apparatus including a display portion capable of displaying an image, a position detecting portion capable of detecting one or more positions designated by a user on a display surface of the display portion, and a gesture event determining portion operable, in response to detection of one or more positions by the position detecting portion, to determine one of a plurality of gesture events on the basis of the one or more positions, wherein the method causes the data processing apparatus to perform a browsing step of executing a browsing program and displaying on the display portion at least a part of externally stored content, wherein the browsing step includes a display area determining step of determining a part of the externally stored content as a display area on the basis of the gesture event determined by the gesture event determining portion, a capture area determining step of, at a time point prior to acquisition of a part of the externally stored content, determining a capture area including the display area determined in the display area determining step, a captured image acquiring step of, in response to determination of the capture area, acquiring a captured image corresponding to the determined capture area from the externally stored content, a temporary memory control step of temporarily storing the acquired captured image, a display image generating step of, during a gesture period in which gesture events are determined continuously by the gesture event determining portion, generating a display image corresponding to the determined display area on the basis of the temporarily stored captured image, and a display control step of displaying the generated display image on the display portion.

Yet another aspect of the present invention provides a non-transitory computer-readable recording medium encoded with a browsing program performed by a computer which controls a data processing apparatus, the data processing apparatus including a display portion capable of displaying an image, a position detecting portion capable of detecting one or more positions designated by a user on a display surface of the display portion, and a gesture event determining portion operable, in response to detection of one or more positions by the position detecting portion, to determine one of a plurality of gesture events on the basis of the one or more positions, wherein the program causes the computer to perform a browsing step of executing a browsing program, acquiring content from the outside, and displaying on the display portion an image of a display area which is at least a part of the acquired content, wherein the browsing step includes a display area determining step of determining the display area on the basis of the gesture event determined by the gesture event determining portion, a capture area determining step of determining a capture area including the display area determined in the display area determining step, a captured image generating step of, in response to determination of the capture area, generating a captured image corresponding to the determined capture area on the basis of the acquired content, a temporary memory control step of temporarily storing the generated captured image, a display image generating step of generating a display image corresponding to the determined display area on the basis of the temporarily stored captured image, and a display control step of displaying the generated display image on the display portion.

Yet another aspect of the present invention provides a non-transitory computer-readable recording medium encoded with a browsing program performed by a computer which controls a data processing apparatus, the data processing apparatus including a display portion capable of displaying an image, a position detecting portion capable of detecting one or more positions designated by a user on a display surface of the display portion, and a gesture event determining portion operable, in response to detection of one or more positions by the position detecting portion, to determine one of a plurality of gesture events on the basis of the one or more positions, wherein the program causes the computer to perform a browsing step of executing a browsing program and displaying on the display portion at least a part of externally stored content, wherein the browsing step includes a display area determining step of determining a part of the externally stored content as a display area on the basis of the gesture event determined by the gesture event determining portion, a capture area determining step of, at a time point prior to acquisition of a part of the externally stored content, determining a capture area including the display area determined in the display area determining step, a captured image acquiring step of, in response to determination of the capture area, acquiring a captured image corresponding to the determined capture area from the externally stored content, a temporary memory control step of temporarily storing the acquired captured image, a display image generating step of, during a gesture period in which gesture events are determined continuously by the gesture event determining portion, generating a display image corresponding to the determined display area on the basis of the temporarily stored captured image, and a display control step of displaying the generated display image on the display portion.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 4 shows an example of the software architecture of a CPU included in the MFP;

FIG. 6 shows an example of a master table;

FIGS. 10 and 11 show examples of a display image;

DESCRIPTION OF THE PREFERRED EMBODIMENTS

Figure 1:
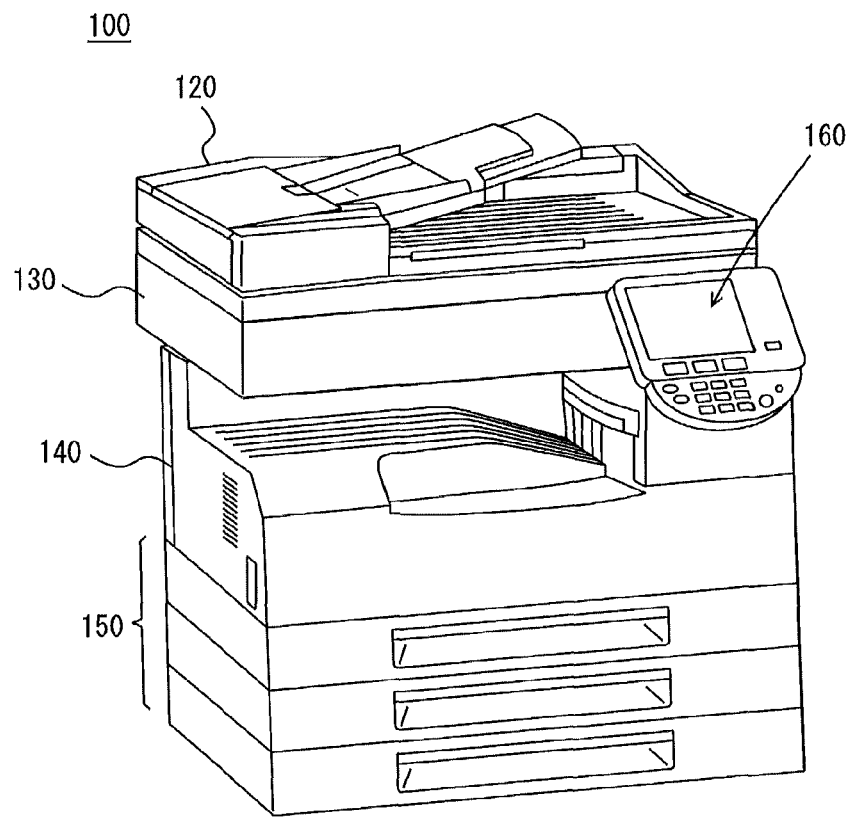
FIG. 1 is a perspective view of an MFP according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

First Embodiment

Figure 2:
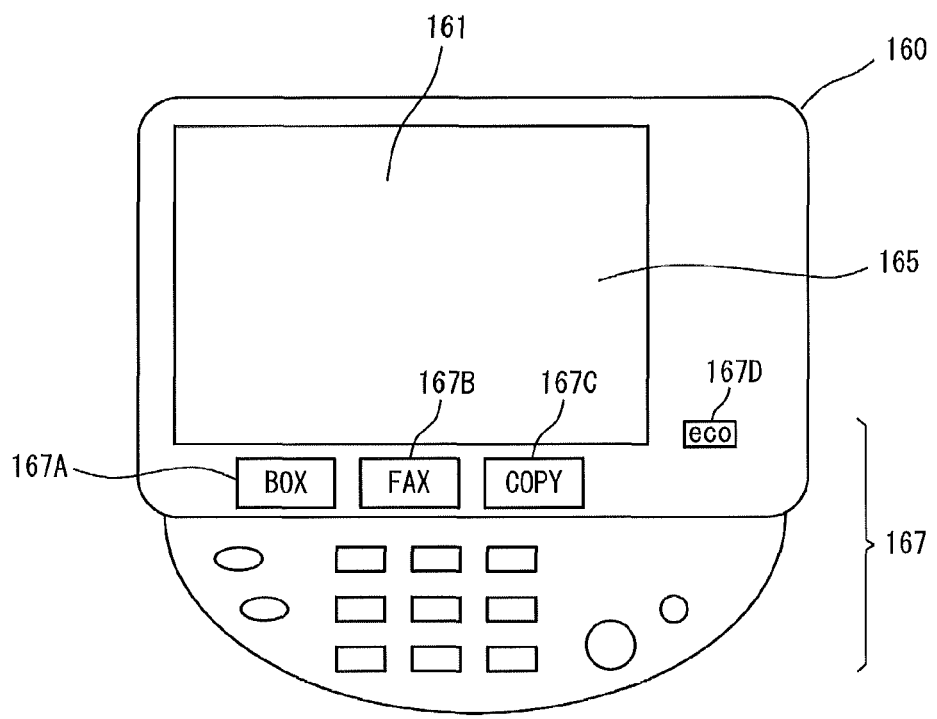
FIG. 2 is a plan view showing an example of an operation panel.

FIG. 1 is a perspective view of an MFP according to an embodiment of the present invention. FIG. 2 is a plan view showing an example of an operation panel. Referring to FIGS. 1 and 2, an MFP 100 includes: a document reading portion 130 for reading a document; an automatic document feeder 120 for feeding a document to document reading portion 130; an image forming portion 140 for forming an image on a sheet of paper or the like on the basis of image data which is output from document reading portion 130 that has read a document; a paper feeding portion 150 for feeding a sheet of paper to image forming portion 140; and an operation panel 160 serving as a user interface.

Operation panel 160 is arranged on an upper surface of MFP 100. Operation panel 160 includes: a display portion 161, a touch panel 165, and a hard key portion 167. Display portion 161 is, for example, a liquid crystal display (LCD), and displays an instruction menu for a user, information about acquired image data, and so on. Hard key portion 167 includes four hard keys 167A to 167D having the characters "BOX", "FAX", "COPY", and "ECO" respectively displayed thereon. Touch panel 165 is a multi-touch-capable touch panel which is disposed on an upper or lower surface of display portion 161, and detects a position designated by a user on the display surface of display portion 161. The user operations of designating touch panel 165 include a multi-touch operation and a single-touch operation. In the multi-touch operation, a user uses a plurality of fingers to designate a plurality of locations on touch panel 165 simultaneously. In the single-touch operation, a user uses one finger to designate one location at a time.

Automatic document feeder 120 automatically feeds a plurality of documents set on a document feed tray, one by one, to a predetermined document reading position set on a platen glass of document reading portion 130, and outputs the document, the image of which has been read by document reading portion 130, onto a document output tray. Document reading portion 130 includes an optical source which irradiates a document placed on the document reading position with light and a photoelectric conversion element which receives light reflected from the document, and scans a document image having a size corresponding to that of the document. The photoelectric conversion element converts the received light into image data made up of electric signals, and outputs the image data to image forming portion 140. Paper feeding portion 150 feeds a sheet of paper, stored in a paper feed tray, to image forming portion 140.

Image forming portion 140 forms an image using well-known electrophotography. Image forming portion 140 performs various kinds of data processing such as shading compensation on image data received from document reading portion 130 and, on the basis of the processed image data, or on the basis of externally received image data, forms an image on a sheet of paper fed by paper feeding portion 150.

Figure 3:
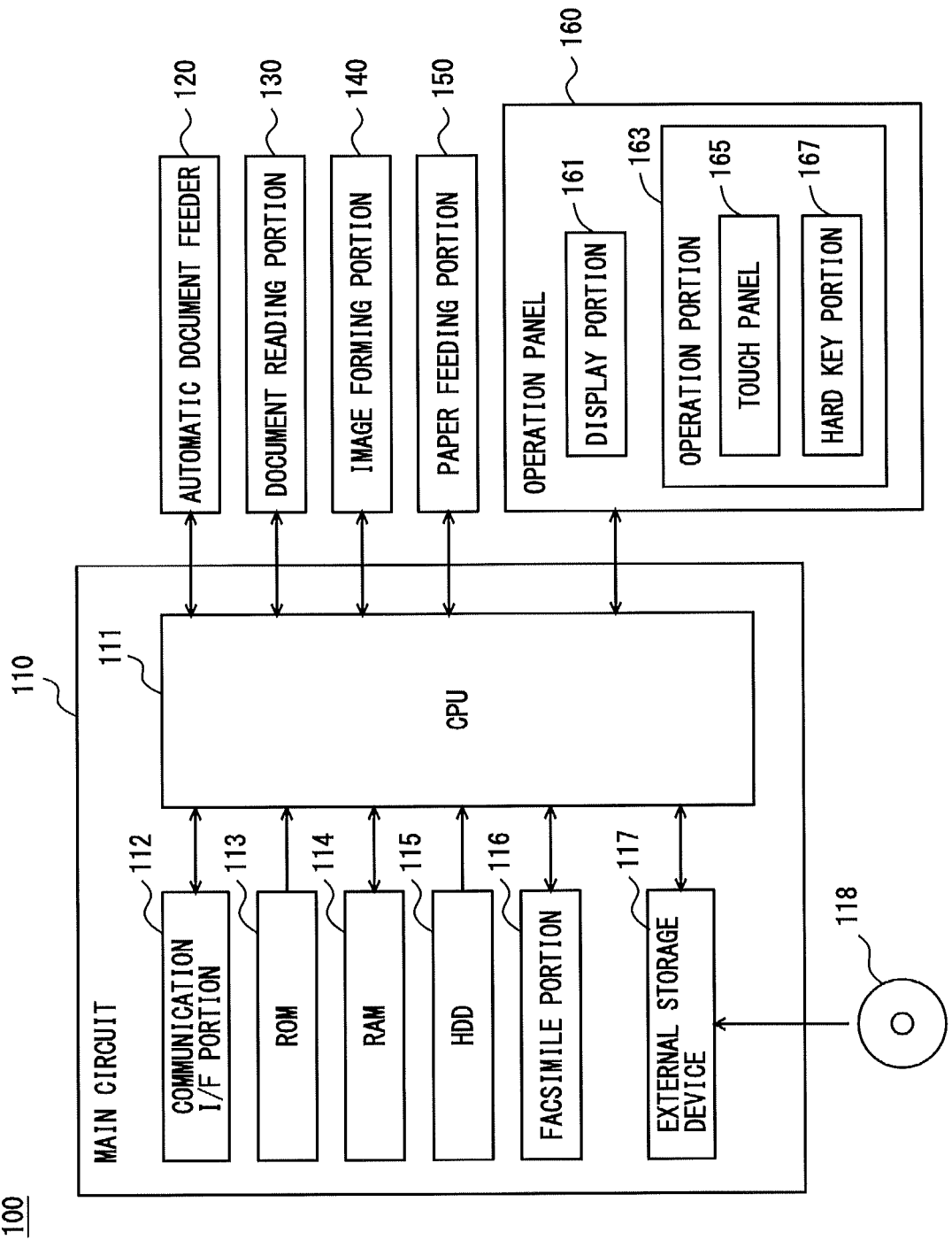
FIG. 3 is a block diagram schematically showing an example of the hardware configuration of the MFP.

FIG. 3 is a block diagram schematically showing an example of the hardware configuration of the MFP. Referring to FIG. 3, MFP 100 includes a main circuit 110. Main circuit 110 includes: a central processing unit (CPU) 111; a communication interface (I/F) portion 112; a read only memory (ROM) 113; a random access memory (RAM) 114; a hard disk drive (HDD) 115 as a mass storage; a facsimile portion 116; and an external storage device 117. CPU 111 is connected with automatic document feeder 120, document reading portion 130, image forming portion 140, paper feeding portion 150, and operation panel 160, and is responsible for overall control of MFP 100.

ROM 113 stores a program to be executed by CPU 111 or data necessary for execution of the program. RAM 114 is used as a work area when CPU 111 executes a program. Further, RAM 114 temporarily stores read images continuously transmitted from document reading portion 130.

Facsimile portion 116 is connected to public switched telephone networks (PSTN), and transmits facsimile data to or receives facsimile data from the PSTN. Facsimile portion 116 stores the received facsimile data in HDD 115. Alternatively, facsimile portion 116 converts the data into print data which can be printed in image forming portion 140, and outputs the print data to image forming portion 140, thereby causing image forming portion 140 to form an image on a sheet of paper on the basis of the facsimile data received by facsimile portion 116. Further, facsimile portion 116 converts the data read by document reading portion 130 or the data stored in HDD 115 into facsimile data, and transmits the facsimile data to a facsimile machine connected to the PSTN.

Communication I/F portion 112 is an interface for connecting MFP 100 to a network. Communication I/F portion 112 communicates with another computer connected to the network, using a communication protocol such as the transmission control protocol (TCP) or the file transfer protocol (FTP). It is noted that the protocol for communication is not particularly limited; any protocol can be used. The network to which communication I/F portion 112 is connected is, for example, a local area network (LAN). It may be connected in a wired or wireless manner. The network is not necessarily the LAN; it may be a wide area network (WAN), a network using the public switched telephone networks (PSTN), or the like. Furthermore, the network is connected to the Internet, so that it is possible for MFP 100 to communicate with a computer, such as a server, connected to the Internet.

External storage device 117, which is controlled by CPU 111, is mounted with a compact disc read-only memory (CD-ROM) 118 or a semiconductor memory. CPU 111 is capable of accessing CD-ROM 118 or the semiconductor memory via external storage device 117. CPU 111 loads the program recorded on CD-ROM 118 or the semiconductor memory mounted on external storage device 117, into RAM 114 for execution. It is noted that the program executed by CPU 111 is not restricted to the program recorded on CD-ROM 118 or the semiconductor memory. CPU 111 may load a program stored in HDD 115, into RAM 114 for execution. In this case, via the network to which communication I/F portion 112 is connected, another computer connected to the network may rewrite the program stored in HDD 115 of MFP 100, or additionally write a new program therein. Further, MFP 100 may download a program from another computer connected to the network, and store the program in HDD 115. As used herein, the "program" includes, not only the program which CPU 111 can execute directly, but also a source program, a compressed program, an encrypted program, and so on.

It is noted that the medium for storing a program executed by CPU 111 is not restricted to CD-ROM 118. It may be an optical disc (magneto-optical (MO) disc, mini disc (MD), digital versatile disc (DVD)), an IC card, an optical card, or a semiconductor memory such as a mask ROM, an erasable programmable ROM (EPROM), an electrically erasable and programmable ROM (EEPROM), or the like.

Operation panel 160 includes display portion 161 and an operation portion 163. Display portion 161 is a display such as a liquid crystal display (LCD) or an organic electro-luminescence display (ELD), and displays an instruction menu for a user, information about acquired image data, and so on. Operation portion 163 includes touch panel 165 and hard key portion 167 made up of a plurality of hard keys. The hard keys included in hard key portion 167 each include a contact switch, which is connected to CPU 111. Each hard key, when depressed by an operation user, closes its contact to close a circuit connected to CPU 111. Each hard key closes the circuit while being depressed by an operation user who operates MFP 100, whereas it opens the circuit while not being depressed by the operation user.

When a plurality of keys included in hard key portion 167 are depressed, operation portion 163 accepts input data, such as instructions, characters, and numerical characters, corresponding to the depressed keys. Touch panel 165 is disposed on an upper or lower surface of display portion 161, and outputs the coordinates of a position designated by the operation user to CPU 111. Touch panel 165 detects the position designated by the operation user with his/her finger or a stylus pen, and outputs the coordinates of the detected position to CPU 111. Touch panel 165 is a multi-touch-capable touch panel. When a user inputs a multi-touch operation, touch panel 165 outputs to CPU 111 a plurality of sets of coordinates corresponding respectively to the plurality of positions designated simultaneously by the user. When a user inputs a single-touch operation, touch panel 165 outputs to CPU 111 a set of coordinates corresponding to the single position designated by the user.

Touch panel 165 preferably has a size equal to or greater than that of the display surface of display portion 161. As touch panel 165 is disposed on the surface of display portion 161, when the operation user designates a position on the display surface of display portion 161, touch panel 165 outputs the coordinates of the position that the operation user has designated on the display surface of display portion 161, to CPU 111. Touch panel 165 may be, for example, of a resistive type, a surface acoustic wave type, an infrared ray type, an electromagnetic induction type, or a capacitance type, although it is not limited to these types.

Operations that can be accepted by operation portion 163 include an operation of depressing the key(s) included in hard key portion 167, and a single-touch operation and a multi-touch operation of designating position(s) on touch panel 165. Hard key portion 167 includes four hard keys 167A to 167D having the characters "BOX", "FAX", "COPY", and "ECO" respectively displayed thereon. Three hard keys 167A, 167B, and 167C with the characters "BOX", "FAX", and "COPY", respectively, are process switching keys assigned with process switching operations for designating switching of the process to be executed by MFP 100. Hard key 167D with the characters "ECO" is a mode switching key assigned with a mode switching operation for designating switching of the mode of MFP 100 from a normal mode to a power saving mode in which less electricity is consumed. When hard key 167A, 167B, or 167C is depressed, operation portion 163 accepts the corresponding process switching operation. When hard key 167D is depressed, operation portion 163 accepts the mode switching operation.

FIG. 4 shows an example of the software architecture of the CPU included in the MFP. Referring to FIG. 4, in CPU 111, an operating system (OS) layer is formed as the bottom layer, and an MFP process layer is formed above the OS layer. Above the MFP process layer, an application platform (PF) layer is formed, and an application layer is formed above the application PF layer.

A task for CPU 111 to execute an OS program belongs to the OS layer. The task belonging to the OS layer performs the process of controlling hardware resources of MFP 100. Here, the hardware resources include communication I/F portion 112, ROM 113, RAM 114, HDD 115, facsimile portion 116, external storage device 117, automatic document feeder 120, document reading portion 130, image forming portion 140, paper feeding portion 150, and operation panel 160. The task belonging to the OS layer controls the hardware resources in accordance with an operating command input from the MFP process layer. Further, the OS layer shares, with the MFP process layer, a plurality of pieces of operation identification information for respectively identifying a plurality of types of operations that can be accepted by operation portion 163 which is one of the hardware resources. When operation portion 163 detects an operation performed by an operation user, the task belonging to the OS layer outputs a piece of operation identification information identifying the detected operation, to the MFP process layer.

A task for CPU 111 to execute an application program belongs to the application layer. In the case where two or more application programs are installed into MFP 100, two or more tasks of executing the respective application programs may belong to the application layer.

The task of executing an application program performs a plurality of types of processes determined by the application program. The plurality of types of processes include a process of causing a task belonging to the MFP process layer to perform a process to be performed in the MFP process layer. In the case of causing the task belonging to the MFP process layer to perform a process, the task of executing the application program outputs an application command. The application command is a command which has been released as an application program interface (API). This facilitates creation of an application program for causing MFP 100 to perform a process. Releasing something means that a third party other than the manufacturer of MFP 100 can use it. The third party is able to use the application commands to develop an application program that can be installed into MFP 100.

Further, the task of executing the application program specifies a process to be performed, from among the plurality of types of processes determined by the application program, on the basis of the operation input by the operation user who operates MFP 100. The task of executing the application program then performs the specified process. The operation input by the operation user operating MFP 100 is accepted in the OS layer when the operation user operates operation portion 163 to input the operation.

The application PF layer, located between the application layer and the MFP process layer, has belonging thereto a task of arbitrating a plurality of tasks belonging to the application layer and also controlling the application commands output from the plurality of tasks belonging to the application layer. More specifically, the application PF layer accepts application commands output respectively from the tasks belonging to the application layer, converts the accepted application commands into internal commands in accordance with a predetermined rule, for standardization, and outputs the internal commands to the MFP process layer. This can address the case where a plurality of application programs are different in version, or the like. Further, the application PF layer brings one of the tasks belonging to the application layer into a currently selected state. The application PF layer outputs the operation which has been accepted by the OS layer and is input from the task belonging to the MFP process layer, to the task that has been set to the currently selected state from among the tasks belonging to the application layer.

The operations input by a user and accepted in the OS layer include a single-touch operation in which the user uses one finger to designate a position on touch panel 165 and a multi-touch operation in which the user uses two or more fingers to designate positions on touch panel 165 simultaneously. Each of the single-touch operation and the multi-touch operation is detected as a mouse event by an operating system, and is input from the application PF layer into the currently selected task among a plurality of tasks belonging to the application layer. Further, one or more mouse events are converted into a gesture event in the MFP process layer, and the gesture event is input from the application PF layer into the currently selected task among a plurality of tasks belonging to the application layer. To this end, the application layer shares, with the MFP process layer, one or more gesture events which can be accepted by an application program, and the task of executing the application program receives one or more gesture events acceptable by the application program, from the task belonging to the application PF layer. The task of executing the application program performs one or more of the plurality of types of processes that correspond(s) to the gesture event(s).

Application commands are associated with internal commands in advance. For example, a commands correspondence table which associates application commands with internal commands may be stored. One application command may correspond to one internal command, or one application command may correspond to a set of two or more internal commands. Further, two or more application commands of different versions may correspond to one internal command or to a set of two or more internal commands. This can address the case where application programs are of different versions. The internal command is a command which depends upon the hardware resource(s) in MFP 100. Internal commands are not released usually, although they may be released.

The MFP process layer, located between the application PF layer and the OS layer, has belonging thereto a task for CPU 111 to execute an MFP process program. The MFP process layer converts an internal command output from a task belonging to the application PF layer, into an operating command which can be interpreted by a task belonging to the OS layer, and outputs the operating command to the task belonging to the OS layer for controlling the hardware resource(s). Although an internal command may actually be converted into one or more operating commands which can be executed by a task belonging to the OS layer, for the convenience sake, it is here assumed that one internal command is converted into one operating command executable by the task belonging to the OS layer.

While the application programs cause MFP 100 to perform the browsing process, copying process, scanning process, printing process, facsimile transmitting/receiving process, data transmitting/receiving process, and so on, the following description will focus on the part related to the process of controlling operation panel 160, among the processes the application programs cause CPU 111 to perform.

Figure 5:
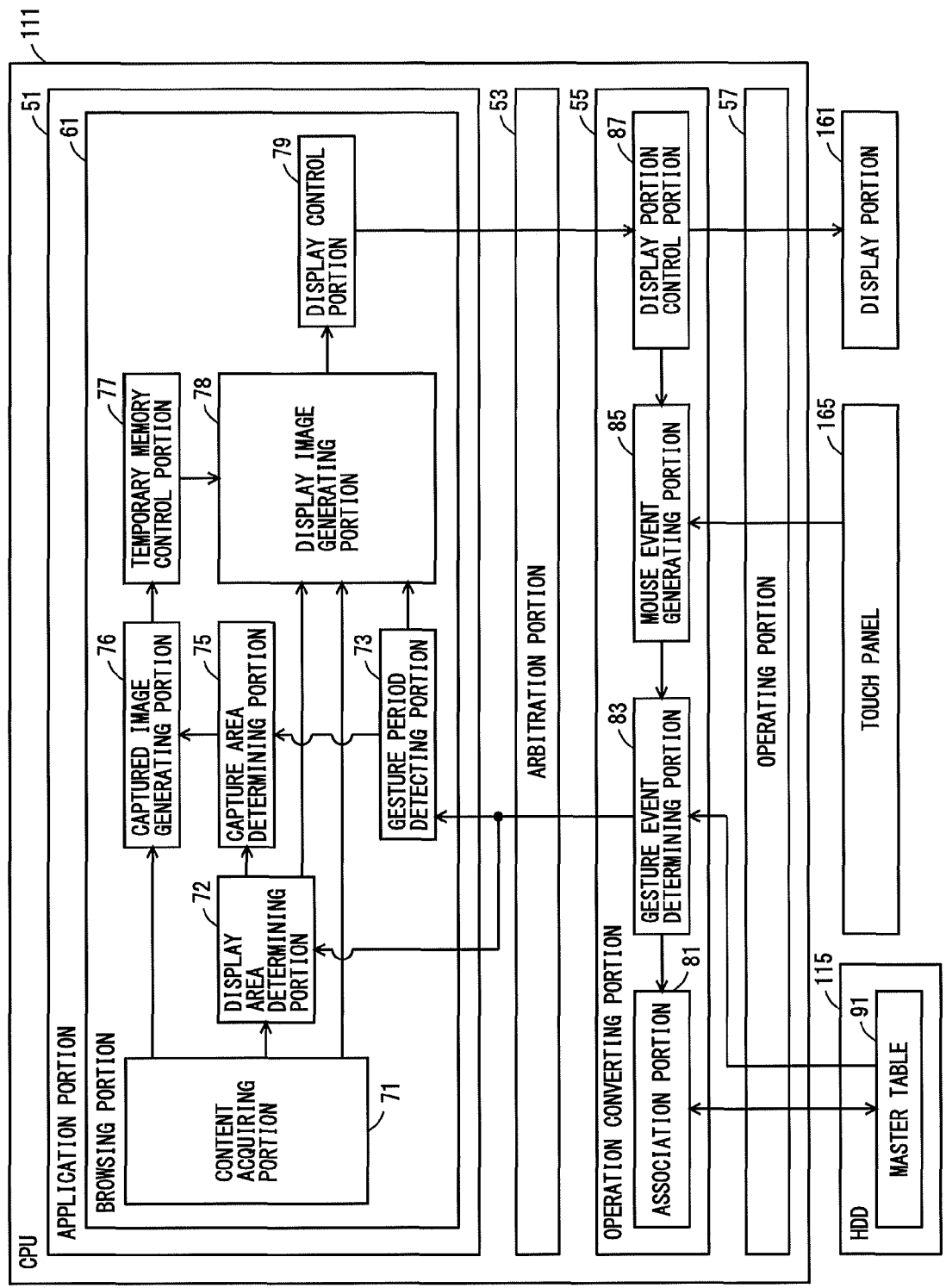
FIG. 5 is a block diagram showing, by way of example, the functions of the CPU included in the MFP according to a first embodiment, together with information stored in a HDD.

FIG. 5 is a block diagram showing, by way of example, the functions of the CPU included in the MFP according to the first embodiment, together with information stored in the HDD. The functions shown in FIG. 5 are implemented by CPU 111 included in MFP 100 as CPU 111 executes programs stored in ROM 113, HDD 115, or CD-ROM 118. Specifically, the functions are implemented by CPU 111 as CPU 111 executes an OS program, an MFP process program, an operation accepting program, and an application program. Shown here are the functions of CPU 111 implemented when a browsing program is installed in MFP 100 as the application program.

Referring to FIG. 5, CPU 111 includes an application portion 51, an arbitration portion 53, an operation converting portion 55, and an operating portion 57. Application portion 51 belongs to the application layer in the software architecture shown in FIG. 4. Application portion 51 includes a browsing portion 61 which executes a browsing program.

Arbitration portion 53 and operation converting portion 55 are functions implemented by tasks for CPU 111 to execute an operation accepting program. Arbitration portion 53 belongs to the application PF layer in the software architecture shown in FIG. 4. Operation converting portion 55 also belongs to the application PF layer in the software architecture shown in FIG. 4. While it is here assumed that all the functions of operation converting portion 55 belong to the application PF layer, it may be configured such that at least some of the functions of operation converting portion 55 belong to the application PF layer and the rest belong to the MFP process layer.

In the case where there are a plurality of tasks which execute application programs in application portion 51, arbitration portion 53 brings one of the plurality of tasks into a currently selected state. Hereinafter, the task that has been set in the currently selected state by arbitration portion 53 will be referred to as "current task". In the present embodiment, application portion 51 includes only browsing portion 61, so that arbitration portion 53 determines browsing portion 61 to be the current task.

Arbitration portion 53 receives an application command output from browsing portion 61, and outputs the application command and application identification information for identifying the task that has output the application command, to operation converting portion 55.

When a plurality of application commands are output from browsing portion 61, arbitration portion 53 determines the order of the application commands, and sequentially outputs them in the determined order to operation converting portion 55. For example, in the case where a plurality of application commands cannot be executed at the same time, arbitration portion 53 waits until operation converting portion 55 finishes the execution of one application command before arbitration portion 53 outputs another application command to operation converting portion 55. In the case where one application command can be executed only after the execution of another application command is finished, even if the one application command is input earlier than the other application command, arbitration portion 53 outputs the other application command first.

Operation converting portion 55 receives an application command from arbitration portion 53, and converts the application command, in accordance with a commands correspondence table, into an internal command for standardization. The commands correspondence table associates one application command with one or more internal commands. The application commands included in the commands correspondence table may include the application commands of the same type but of different versions. In such a case, each of the application commands of different versions is associated with one or more internal commands. This enables installation of application programs having application commands of different versions described therein. When a new application command appears, the commands correspondence table is updated with a commands correspondence table in which the new application command is associated with one or more internal commands. This enables installation of an application program having the new application command described therein.

Further, operation converting portion 55 converts the standardized internal command into an operating command, and outputs the operating command to operating portion 57. The operating command is a command that has been predetermined between operation converting portion 55 and operating portion 57 and that can be interpreted by operating portion 57.

Operating portion 57 is a function implemented by a task for CPU 111 to execute an OS program. Operating portion 57 belongs to the OS layer in the software architecture shown in FIG. 4.

Operating portion 57 receives an operating command output from operation converting portion 55, and controls hardware resources in accordance with the operating command. Here, display portion 161, touch panel 165 in operation portion 163, and HDD 115 will be described as examples of the hardware resources. Operating portion 57 controls display portion 161 to cause it to display an image. Further, operating portion 57 controls HDD 115 to cause it to store data, and also reads data stored in HDD 115. Furthermore, operating portion 57 causes touch panel 165 to detect a position designated by a user, at a prescribed time interval, and acquires positional information from touch panel 165 at a prescribed time interval.

When an operation user designates a position on the display surface of display portion 161, touch panel 165 detects the position designated by the operation user, and outputs the positional information indicating the position on the display surface of display portion 161, to CPU 111. When operating portion 57 receives positional information from touch panel 165, operating portion 57 outputs the positional information to operation converting portion 55. Operating portion 57 may receive two or more pieces of positional information simultaneously from touch panel 165. For example, when an operation user uses two fingers to designate two different positions on the display surface of display portion 161 simultaneously, operating portion 57 accepts two pieces of positional information which respectively indicate the two positions designated on the display surface. When operating portion 57 accepts two or more pieces of positional information simultaneously from touch panel 165, operating portion 57 outputs the two or more pieces of positional information to operation converting portion 55.

Operation converting portion 55 includes an association portion 81, a gesture event determining portion 83, a mouse event generating portion 85, and a display portion control portion 87. At the stage when a browsing program is installed, association portion 81 associates each of a plurality of types of processes determined by the browsing program with one of a plurality of gesture events. Specifically, association portion 81 generates a master table in which a plurality of pieces of process identification information respectively identifying the plurality of types of processes determined by the browsing program are associated with corresponding ones of gesture events acceptable by the browsing program, and stores the generated master table into HDD 115.

FIG. 6 shows an example of the master table. Referring to FIG. 6, master table 91 includes a master record for each of a plurality of pieces of process identification information. Each master record includes a "process" field and a "gesture" field. In the "process" field, process identification information is set. In the "gesture" field, gesture identification information for identifying a gesture event is set.

For example, the master record with the process identification information "Page Turning" set in the "process" field has the gesture identification information "Swipe" set in the "gesture" field. The process specified by the process identification information "Page Turning" is the process of changing the screen to a next page. The gesture event specified by the gesture identification information "Swipe" corresponds to the user operation of moving a finger, while designating a position on touch panel 165, to the left, right, up, or down at a speed equal to or higher than a prescribed speed. As the direction of moving a finger is determined during the operation of moving the finger at a speed equal to or higher than a prescribed speed, the gesture event specified by the gesture identification information "Swipe" includes the direction of moving the finger as a parameter.

The master record with the process identification information "Enlargement" set in the "process" field has the gesture identification information "Pinch Out" set in the "gesture" field. The process specified by the process identification information "Enlargement" is the process of zooming in on the screen. The gesture event specified by the gesture identification information "Pinch Out" corresponds to the user operation of moving at least one of the two locations designated on touch panel 165 such that the spacing between the two locations increases. As the spacing between the two locations is changed during the operation of moving the finger(s) to increase the spacing between the two locations, the gesture event specified by the gesture identification information "Pinch Out" includes, as a parameter, a scaling factor indicating the rate of change of the spacing between the two locations.

The master record with the process identification information "Reduction" set in the "process" field has the gesture identification information "Pinch In" set in the "gesture" field. The process specified by the process identification information "Reduction" is the process of zooming out on the screen. The gesture event specified by the gesture identification information "Pinch In" corresponds to the user operation of moving at least one of the two locations designated on touch panel 165 such that the spacing between the two locations decreases. As the spacing between the two locations is changed during the operation of moving the finger(s) to decrease the spacing between the two locations, the gesture event specified by the gesture identification information "Pinch In" includes, as a parameter, a scaling factor indicating the rate of change of the spacing between the two locations.

The master record with the process identification information "Rotation" set in the "process" field has the gesture identification information "Rotation" set in the "gesture" field. The process specified by the process identification information "Rotation" is the process of rotating a screen to change the direction of the screen. The gesture event specified by the gesture identification information "Rotation" is detected when the user operation of moving at least one of the two locations designated on touch panel 165 such that the direction of the straight line connecting the two locations is changed is input. For example, a user may input an operation of drawing an arc with one finger about the location designated by the other finger. As the direction in which the arc is drawn is clockwise or counterclockwise, the gesture event specified by the gesture identification information "Rotation" includes either the clockwise direction or the counterclockwise direction as a parameter.

The master record with the process identification information "Scroll" set in the "process" field has the gesture identification information "Flick" set in the "gesture" field. The process specified by the process identification information "Scroll" is the process of scrolling a screen to the left, right, up, or down. The gesture event specified by the gesture identification information "Flick" corresponds to the user operation of moving a finger, while designating a position on touch panel 165, to the left, right, up, or down at a speed lower than the threshold value that is also used for determination of the user operation corresponding to the gesture event identified by the gesture identification information "Swipe". As the direction of moving a finger is determined during the operation of moving the finger at a speed lower than the threshold value, the gesture event specified by the gesture identification information "Flick" includes the direction of moving the finger as a parameter.

The master record with the process identification information "Select Content" set in the "process" field has the gesture identification information "Double Tap" set in the "gesture" field. The process specified by the process identification information "Select Content" is the process of selecting content.

Returning to FIG. 5, display portion control portion 87 converts the application command input from browsing portion 61, into an operating command for causing display portion 161 to display an image, and outputs the operating command to operating portion 57. This causes a display image generated by browsing portion 61 to be stored into a video RAM (VRAM) included in display portion 161, and at least a part of the display image to be displayed on display portion 161.

When mouse event generating portion 85 receives positional information from operating portion 57, mouse event generating portion 85 generates a mouse event. Further, each time mouse event generating portion 85 generates a mouse event, it outputs the generated mouse event to gesture event determining portion 83. When mouse event generating portion 85 receives a plurality of pieces of positional information simultaneously from operating portion 57, mouse event generating portion 85 generates a plurality of mouse events corresponding respectively to the pieces of positional information. In the case where mouse event generating portion 85 generates one or more mouse events, it outputs the generated one or more mouse events to gesture event determining portion 83. The positional information indicates a position on the display surface of display portion 161, designated by an operation user.

The operations by which an operation user designates a position on the display surface of display portion 161 include: a designation starting operation by which a user designates an arbitrary position on the display surface of display portion 161; a move operation by which the user moves the designated position while designating (or, touching) the display surface of display portion 161; and an exit operation by which the user terminates the designation performed on the display surface of display portion 161. When mouse event generating portion 85 receives positional information from operating portion 57, mouse event generating portion 85 determines whether the operation performed by the operation user is the designation starting operation, the move operation, or the exit operation. As described above, each time the positional information is output from touch panel 165, operating portion 57 outputs the positional information. Therefore, mouse event generating portion 85 determines whether the operation performed by the operation user is the designation starting operation, the move operation, or the exit operation, on the basis of the continuity of the pieces of positional information which are input continuously over time.

When mouse event generating portion 85 receives positional information from operating portion 57 after no positional information has been received therefrom for a prescribed period of time, mouse event generating portion 85 determines, for the received positional information, that the operation user has performed the designation starting operation. Then, mouse event generating portion 85 generates a mouse event including the positional information and state identification information "Press" for identifying the designation starting operation.

Following the detection of the mouse event whose state identification information is "Press", when mouse event generating portion 85 receives one or more pieces of positional information continuously from operating portion 57, mouse event generating portion 85 determines, for each of the received pieces of positional information, that the operation user has performed the move operation. Then, for each of the one or more pieces of positional information input continuously from operating portion 57, mouse event generating portion 85 generates a mouse event including the positional information and state identification information "Move" for identifying the move operation.

Following the detection of the mouse event whose state identification information is "Move", when mouse event generating portion 85 no longer receives positional information from operating portion 57, mouse event generating portion 85 determines, for the lastly received positional information, that the operation user has performed the exit operation. Then, mouse event generating portion 85 generates a mouse event including the lastly received positional information and state identification information "Release" for identifying the exit operation.

More specifically, mouse event generating portion 85 determines the state of a mouse event on the basis of the positional information that is input from operating portion 57 at a first time and the positional information that is input from operating portion 57 at a second time which is a prescribed time after the first time. In the case where positional information is input at the first time but no positional information indicating a position within the range of a prescribed distance from the position determined by the positional information input at the first time was input a prescribed time before the first time, then mouse event generating portion 85 determines the state of the mouse event for the positional information input at the first time to be "Press". In the case where the position determined by the positional information input at the first time does not fall within the range of a prescribed distance from the position determined by the positional information input at the second time, then mouse event generating portion 85 determines the state of the mouse event for the positional information input at the second time to be "Press".

Further, in the case where the position determined by the positional information input at the first time falls within the range of a prescribed distance from the position determined by the positional information input at the second time, then mouse event generating portion 85 determines the state of the mouse event for the positional information input at the second time to be "Move". Further, in the case where no positional information indicating a position within the range of a prescribed distance from the position determined by the positional information input at the first time is input at the second time, then mouse event generating portion 85 determines, at the second time, the state of the mouse event for the positional information input at the first time to be "Release".

Gesture event determining portion 83 determines a gesture event on the basis of a plurality of mouse events continuously input from mouse event generating portion 85. In the case where mouse events are continuously input one at a time from mouse event generating portion 85, gesture event determining portion 83 specifies a second mouse event which is input a prescribed time after the first mouse event was input. Then, in the case where the distance between the position determined by the first mouse event and the position determined by the second mouse event is equal to or greater than a prescribed distance, gesture event determining portion 83 determines a gesture event, whereas when the distance between the two positions is smaller than the prescribed distance, gesture event determining portion 83 refrains from determining a gesture event. The prescribed time may be determined arbitrarily. For example, the prescribed time can be set to several times the interval of detection of positions by touch panel 165. The prescribed distance may also be determined arbitrarily, although it is preferably set to 40 pixels, for example.

In the case where two or more mouse events are simultaneously input from mouse event generating portion 85, gesture event determining portion 83 determines a gesture event on the basis of the two or more mouse events. Therefore, when a user inputs a multi-touch operation, gesture event determining portion 83 determines a gesture event. Specifically, in the case where a first mouse event and a second mouse event are input simultaneously from mouse event generating portion 85, gesture event determining portion 83 determines a gesture event on the basis of a first set of a plurality of mouse events which are continuously input in relation to the first mouse event, and a second set of a plurality of mouse events which are continuously input in relation to the second mouse event. The mouse events included in the first set have their positional information identical to or continuous with one another. Here, being "continuous" means that two pieces of positional information indicate positions adjacent to each other. The mouse events included in the second set have their positional information identical to or continuous with one another. Therefore, gesture event determining portion 83 refers to the positional information included in each of the simultaneously input mouse events, to determine whether the mouse event belongs to the first set or the second set.

When gesture event determining portion 83 receives mouse events continuously from mouse event generating portion 85, the state identification information of the firstly input mouse event is "Press". Then, when gesture event determining portion 83 receives a mouse event whose state identification information is "Move", gesture event determining portion 83 calculates a distance between the two points, on the basis of the positional information included in the mouse event whose state identification information is "Press" and the positional information included in the mouse event whose state identification information is "Move", and detects a user's swipe operation if the distance is a prescribed threshold value TH or greater, while it detects a user's flick operation if the distance is smaller than the prescribed threshold value TH. When a plurality of mouse events are input, a user's swipe operation may be detected by earlier mouse events and a user's flick operation may be detected by later mouse events. When gesture event determining portion 83 detects a swipe operation or a flick operation, it calculates a direction from the position specified by the positional information included in the preceding mouse event toward the position specified by the positional information included in the succeeding mouse event, determines one of the left, right, top, and down directions relative to the display surface of display portion 161 that is closest to the calculated direction, as a parameter, and determines a gesture event including the parameter. When gesture event determining portion 83 detects a swipe operation, it determines a gesture event which includes the gesture identification information "Swipe" for identifying the gesture event and a parameter indicating a direction. When gesture event determining portion 83 detects a flick operation, it determines a gesture event which includes the gesture identification information "Flick" and a parameter indicating a direction.

In the case where gesture event determining portion 83 receives two mouse events simultaneously from mouse event generating portion 85, the state of each of the firstly input two mouse events is "Press". In this case, gesture event determining portion 83 calculates, on the basis of the positional information included in the respective mouse events, a distance L1 between the two points and an angle R1 of a straight line connecting the two points. The angle of the straight line connecting the two points may be an angle between the straight line and a reference line extending in a lateral direction of display portion 161. The angle between the reference line and the straight line connecting the two points is calculated clockwise from the reference line. Then, as two mouse events are subsequently input continuously, gesture event determining portion 83 calculates, on the basis of the positional information included in the subsequently input two mouse events, a distance L2 between the two points and an angle R2 of a straight line connecting the two points.

In the case where the angle R1 and the angle R2 are the same and the distance L2 is different from the distance L1, then gesture event determining portion 83 detects a pinch-out operation or a pinch-in operation by a user. Here, the determination that the angle R1 and the angle R2 are the same means that the difference between the angle R1 and the angle R2 is within a prescribed range. A certain margin of error is set for detecting the motions of the user fingers. If the distance L2 is greater than the distance L1, gesture event determining portion 83 detects a pinch-out operation. If the distance L2 is smaller than the distance L1, gesture event determining portion 83 detects a pinch-in operation. When detecting a pinch-out or pinch-in operation, gesture event determining portion 83 calculates a scaling factor by dividing the distance L2 by the distance L1, determines the calculated scaling factor as a parameter, and determines a gesture event including the parameter. When gesture event determining portion 83 detects a pinch-out operation, it determines a gesture event including the gesture identification information "Pinch Out" and a parameter indicating a scaling factor. When gesture event determining portion 83 detects a pinch-in operation, it determines a gesture event including the gesture identification information "Pinch In" and a parameter indicating a scaling factor.

In the case where the angle R1 and the angle R2 are different from each other, gesture event determining portion 83 detects a rotation operation by a user. Here, the determination that the angle R1 and the angle R2 are different from each other means that the difference between the angle R1 and the angle R2 is outside the prescribed range. A certain margin of error is set for detecting the motions of the user fingers. When detecting a rotation operation, gesture event determining portion 83 determines the direction of rotation by subtracting the angle R1 from the angle R2, determines the determined rotational direction as a parameter, and determines a gesture event including the parameter. If the value obtained by subtracting the angle R1 from the angle R2 is positive, the rotational direction is clockwise. If the value is negative, the rotational direction is counterclockwise. Gesture event determining portion 83 determines a gesture event including the gesture identification information "Rotation" and a parameter indicating a direction of rotation.

When gesture event determining portion 83 determines a gesture event, gesture event determining portion 83 reads, from HDD 115, master table 91 corresponding to the application identification information of the current task which has been set by arbitration portion 53. Specifically, gesture event determining portion 83 outputs an operating command instructing to read master table 91 to operating portion 57, and acquires master table 91 that operating portion 57 reads by controlling HDD 115. In the following description, it is assumed that browsing portion 61 is the current task.

In response to determination of a gesture event, gesture event determining portion 83 specifies, from among a plurality of types of processes determined in master table 91, a process that is associated with the gesture event in correspondence with the application program being set in the currently selected state by arbitration portion 53. Here, as browsing portion 61 has been set as the current task by arbitration portion 53, gesture event determining portion 83 specifies the process that is associated with the gesture event by master table 91 for the browsing program, as shown in FIG. 6. More specifically, gesture event determining portion 83 extracts, from master table 91, a master record in which the gesture identification information included in the determined gesture event is set in the "gesture" field, and acquires the process identification information that is set in the "process" field in the extracted master record. When the process identification information is acquired, gesture event determining portion 83 outputs the determined gesture event to arbitration portion 53. When no process identification information is acquired, gesture event determining portion 83 refrains from outputting the determined gesture event to arbitration portion 53. Further, in the case where gesture event determining portion 83 continuously receives mouse events, one at a time, from mouse event generating portion 85 but determines no gesture event, gesture event determining portion 83 outputs a non-determination signal indicating that no gesture event is determined, to arbitration portion 53.

Gesture event determining portion 83 outputs, to arbitration portion 53, only the gesture event corresponding to the process that can be executed by browsing portion 61 which has been set in the currently selected state by arbitration portion 53. Arbitration portion 53 outputs the gesture event to browsing portion 61 which is the current task. This makes it possible to cause browsing portion 61, which executes the browsing program, to perform the process corresponding to the gesture event which is the operation input to touch panel 165 and specified by a set of mouse events. In other words, at the stage of program development, a browsing program can be developed without any concern for the gesture events which can be accepted by touch panel 165 in MFP 100. For example, it is possible to develop a browsing program which accepts no rotation operation.

Arbitration portion 53 receives a gesture event from gesture event determining portion 83, and outputs the gesture event to a current task which is one of a plurality of tasks in application portion 51 for CPU 111 to execute application programs. Here, as application portion 51 includes only browsing portion 61, arbitration portion 53 sets browsing portion 61 in the currently selected state. That is, browsing portion 61 is the current task. When arbitration portion 53 receives a gesture event from gesture event determining portion 83, arbitration portion 53 outputs the gesture event to browsing portion 61.

Browsing portion 61 includes a content acquiring portion 71, a display area determining portion 72, a gesture period detecting portion 73, a capture area determining portion 75, a captured image generating portion 76, a temporary memory control portion 77, a display image generating portion 78, and a display control portion 79.

Content acquiring portion 71 acquires content from a server connected to the Internet, and outputs the acquired content to display area determining portion 72, captured image generating portion 76, and display image generating portion 78. The content is, for example, a Web page described in a markup language such as hypertext markup language (HTML). Content acquiring portion 71 acquires a Web page, but does not acquire other content such as image data or another Web page linked to the Web page. It is noted that content acquiring portion 71 may be configured to acquire other content linked to the Web page. The content acquired by content acquiring portion 71 may be a Web page identified by the uniform resource locator (URL) designated by an operation user who operates MFP 100, or a Web page identified by the URL predetermined in browsing portion 61.

Display area determining portion 72 determines, as a display area, at least a part of the Web page input from content acquiring portion 71. Display area determining portion 72 interprets the Web page, and determines at least a part of a display image corresponding to the Web page as the display area. Display area determining portion 72 determines a display area at the time when content has been acquired by content acquiring portion 71, and at the time when a gesture event is input from gesture event determining portion 83. At the time point when the content has been acquired by content acquiring portion 71, or in other words, at the time point when content acquiring portion 71 has downloaded the Web page, display area determining portion 72 determines, as the display area, an area which has been determined by default. The default display area may be determined by the Web page, or it may be determined on the basis of the size of the display image corresponding to the Web page and the size of display portion 161.

In the case where display area determining portion 72 receives gesture events from gesture event determining portion 83, display area determining portion 72 determines a display area each time a gesture event is input. Display area determining portion 72 outputs the determined display area to capture area determining portion 75 and display image generating portion 78. A display area is a rectangular region, which is specified by a pair of diagonal points. Therefore, a display area includes the coordinates of the pair of diagonal points in the image of the content.

The gesture event input from gesture event determining portion 83 has gesture identification information "Swipe", "Flick", "Pinch Out", "Pinch In", "Rotation", or "Double Tap". When a gesture event having the gesture identification information "Flick" is input, display area determining portion 72 determines an area obtained by moving the then effective display area (i.e. the display area which has been determined before then) by a prescribed distance in the direction specified by the parameter, as a new display area. When a gesture event having the gesture identification information "Swipe" is input, display area determining portion 72 determines an area obtained by turning a page from the then effective display area in the direction specified by the parameter, as a new display area. When a gesture event having the gesture identification information "Pinch Out" is input, display area determining portion 72 determines an area obtained by reducing in size the then effective display area by the scaling factor specified by the parameter, as a new display area. When a gesture event having the gesture identification information "Pinch In" is input, display area determining portion 72 determines an area obtained by enlarging the then effective display area by the scaling factor specified by the parameter, as a new display area. When a gesture event having the gesture identification information "Rotation" is input, display area determining portion 72 determines an area obtained by rotating the then effective display area in the direction of rotation specified by the parameter, as a new display area. When a gesture event having the gesture identification information "Double Tap" is input, display area determining portion 72 determines the then effective display area, as it is, as the display area.

Gesture period detecting portion 73 detects a gesture period on the basis of the gesture events input from gesture event determining portion 83. While detecting the gesture period, gesture period detecting portion 73 outputs a gesture period signal indicating that the gesture period is ongoing, to capture area determining portion 75 and display image generating portion 78. The gesture period is a period during which gesture events are continuously determined by gesture event determining portion 83.

Specifically, while gesture event determining portion 83 determines a gesture event on the basis of one or more mouse events, mouse events may be generated continuously by mouse event generating portion 85 after a gesture event has been determined by gesture event determining portion 83. For example, when a user inputs a swipe operation, a gesture event may be determined by gesture event determining portion 83 while the user is still moving his/her finger. In this case, mouse events having the state identification information "Move" are generated by mouse event generating portion 85 until the user moves his/her finger away from touch panel 165. When the user releases his/her finger from touch panel 165, a mouse event having the state identification information "Release" is generated by mouse event generating portion 85. Once gesture event determining portion 83 has determined the gesture event having the gesture identification information "Swipe", each time a mouse event with the state identification information "Move" is input, gesture event determining portion 83 outputs a gesture event with the gesture identification information "Swipe" until a mouse event having the state identification information "Release" is input from mouse event generating portion 85. Gesture period detecting portion 73 detects the gesture period while receiving the same gesture events continuously from gesture event determining portion 83. When gesture period detecting portion 73 receives a gesture event from gesture event determining portion 83, gesture period detecting portion 73 detects the start of a gesture period. When gesture period detecting portion 73 no longer receives the same gesture event, or when gesture period detecting portion 73 receives a different gesture event, gesture period detecting portion 73 detects the end of the gesture period.

Capture area determining portion 75 receives a display area from display area determining portion 72, and receives a gesture period signal from gesture period detecting portion 73. Capture area determining portion 75 determines a capture area including the display area received from display area determining portion 72, at the time of initiation of the gesture period. Capture area determining portion 75 determines the time when a gesture period signal has been input from gesture period detecting portion 73 following a prescribed period during which no gesture period signal had been input therefrom, as the time of initiation of the gesture period. The capture area is at least a part of an image of content, and includes the display area. The capture area has an area greater than that of the display area. The method for determining a capture area is not particularly limited; the position and size of a capture area can be determined arbitrarily. One example thereof will be described here. Capture area determining portion 75 determines the size of the capture area on the basis of the size of display portion 161, a scaling factor of an image of content, and free space on RAM 114. Here, the size of an image is expressed in the number of pixels in a vertical direction and the number of pixels in a horizontal direction. Further, the size of display portion 161 is expressed in the number of pixels in a vertical direction and the number of pixels in a horizontal direction on display portion 161. The scaling factor of an image of content is determined by the size of the display area of the image of the content and the size of display portion 161, and is obtained by dividing the number of pixels in the horizontal direction of the display area of the image of content, by the number of pixels in the horizontal direction on display portion 161. In the present embodiment, the scaling factor of an image of content at the stage of acquisition of the content is set to "1". The scaling factor of an image of the content is a value which is changed when a user inputs a pinch-out operation or a pinch-in operation.

When the size of display portion 161 is represented as S (in the number of pixels), the scaling factor of an image of content as b, and free space on RAM 114 as m (in the number of pixels), capture area determining portion 75 finds the maximum integer n of not greater than m/(b*S), and determines a value obtained by multiplying the size S of display portion 161 by n, as the size of the capture area. It should be noted that the free space on RAM 114 is here expressed in the number of pixels because the number of bytes per pixel varies depending upon an image of content. For expressing the storage capacity in bytes, the value obtained by dividing the storage capacity M (in bytes) by the number of bytes per pixel may be used.

Following the determination of the size of the capture area, capture area determining portion 75 determines an area having the determined size and including the display area at the center thereof, as the capture area. In the case where the display area is located at an edge of an image of content, capture area determining portion 75 determines the capture area so that the entire capture area includes at least a part of the image of the content and includes the entire display area. Capture area determining portion 75 outputs the determined capture area to captured image generating portion 76. A capture area is a rectangular region, which is specified by a pair of diagonal points. Therefore, a capture area includes the coordinates of the pair of diagonal points in the image of the content.

Captured image generating portion 76 receives a Web page (i.e. content) from content acquiring portion 71 and a capture area from capture area determining portion 75, and generates a captured image on the basis of the Web page. Specifically, in response to input of the capture area from capture area determining portion 75, captured image generating portion 76 analyzes the Web page, and generates an image corresponding to the capture area of the Web page. Captured image generating portion 76 outputs the generated image as a captured image to temporary memory control portion 77. Capture area determining portion 75 determines the capture area at the time of initiation of the gesture period, so that captured image generating portion 76 generates a captured image at the time of initiation of the gesture period.

When temporary memory control portion 77 receives a captured image from captured image generating portion 76, temporary memory control portion 77 stores the captured image into RAM 114, and also notifies display image generating portion 78 that the captured image has been stored. For example, temporary memory control portion 77 notifies display image generating portion 78 of the address or file name of the captured image stored in RAM 114. It is here assumed that the file name of the captured image is notified.

Display image generating portion 78 receives a Web page (i.e. content) from content acquiring portion 71, a display area from display area determining portion 72, a gesture period signal from gesture period detecting portion 73, and the file name of a captured image from temporary memory control portion 77. Display image generating portion 78 generates a display image at the time when content has been acquired by content acquiring portion 71, at the time when a gesture event is determined during the gesture period, and at the time when the gesture period is terminated. Display image generating portion 78 outputs the generated display image to display control portion 79.

Specifically, during the gesture period, display image generating portion 78 generates a display image corresponding to the display area on the basis of the captured image stored in RAM 114. Display image generating portion 78 reads from RAM 114 the captured image corresponding to the file name input from temporary memory control portion 77, and extracts, from the read captured image, an area specified by the display area input from display area determining portion 72 during the gesture period, as a display image. At the time when a Web page is acquired by content acquiring portion 71, or at the time when the gesture period is terminated, display image generating portion 78 generates a display image on the basis of the Web page input from content acquiring portion 71. Display image generating portion 78 analyzes the Web page, and generates an image corresponding to the display area of the Web page, as a display image. Display image generating portion 78 determines the time when an input of the gesture period signal has ceased following the period during which the gesture period signals had been input from gesture period detecting portion 73, as the time of termination of the gesture period.

When display control portion 79 receives a display image from display image generating portion 78, display control portion 79 displays the display image on display portion 161. Specifically, display control portion 79 outputs an application command to arbitration portion 53, in order to display the display image on display portion 161. This causes operating portion 57 to store the display image into the VRAM included in display portion 161, and display the display image on display portion 161.

Figure 7A:
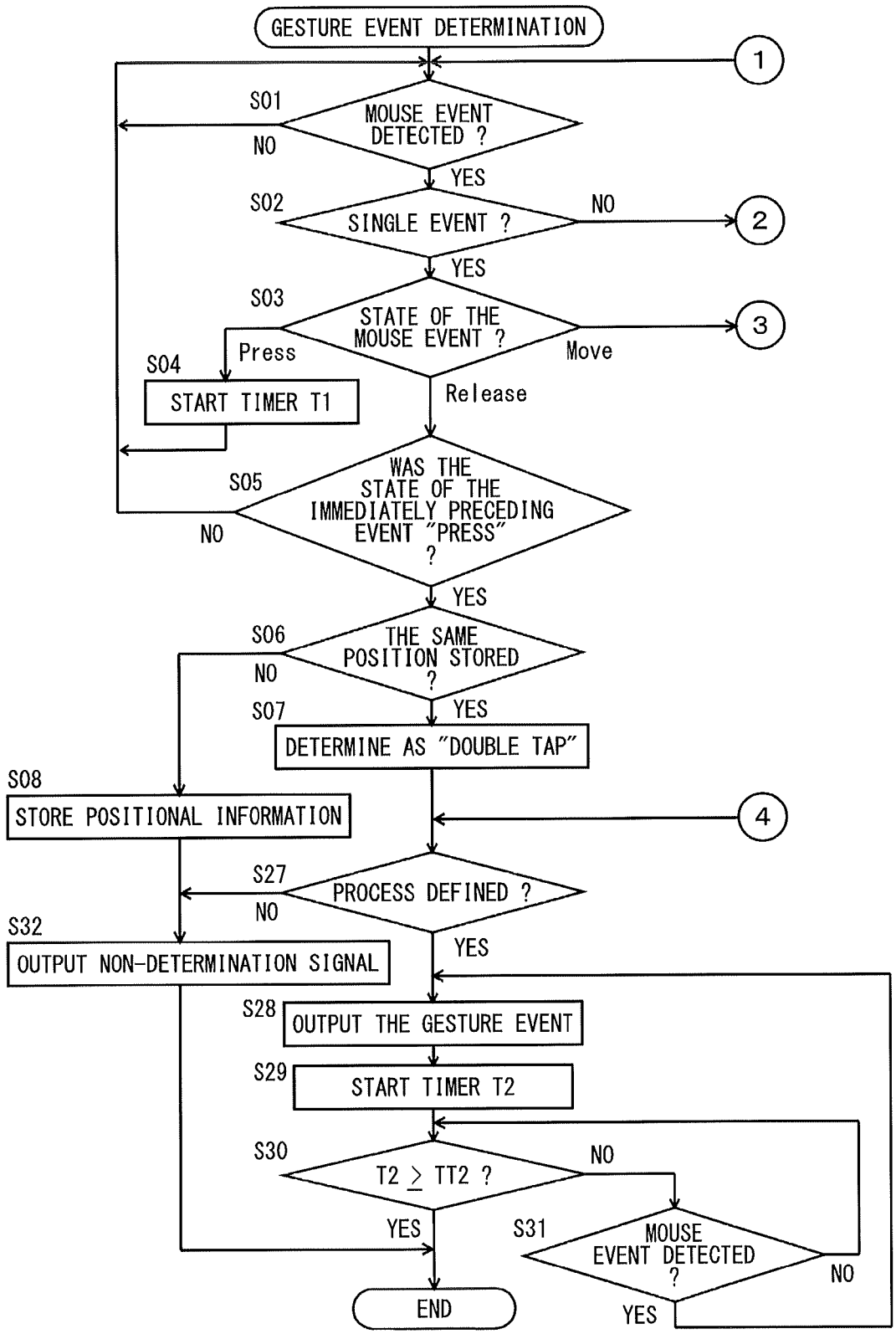
FIGS. 7A and 7B show a flowchart illustrating an example of the flow of a gesture event determining process.
Figure 7B:
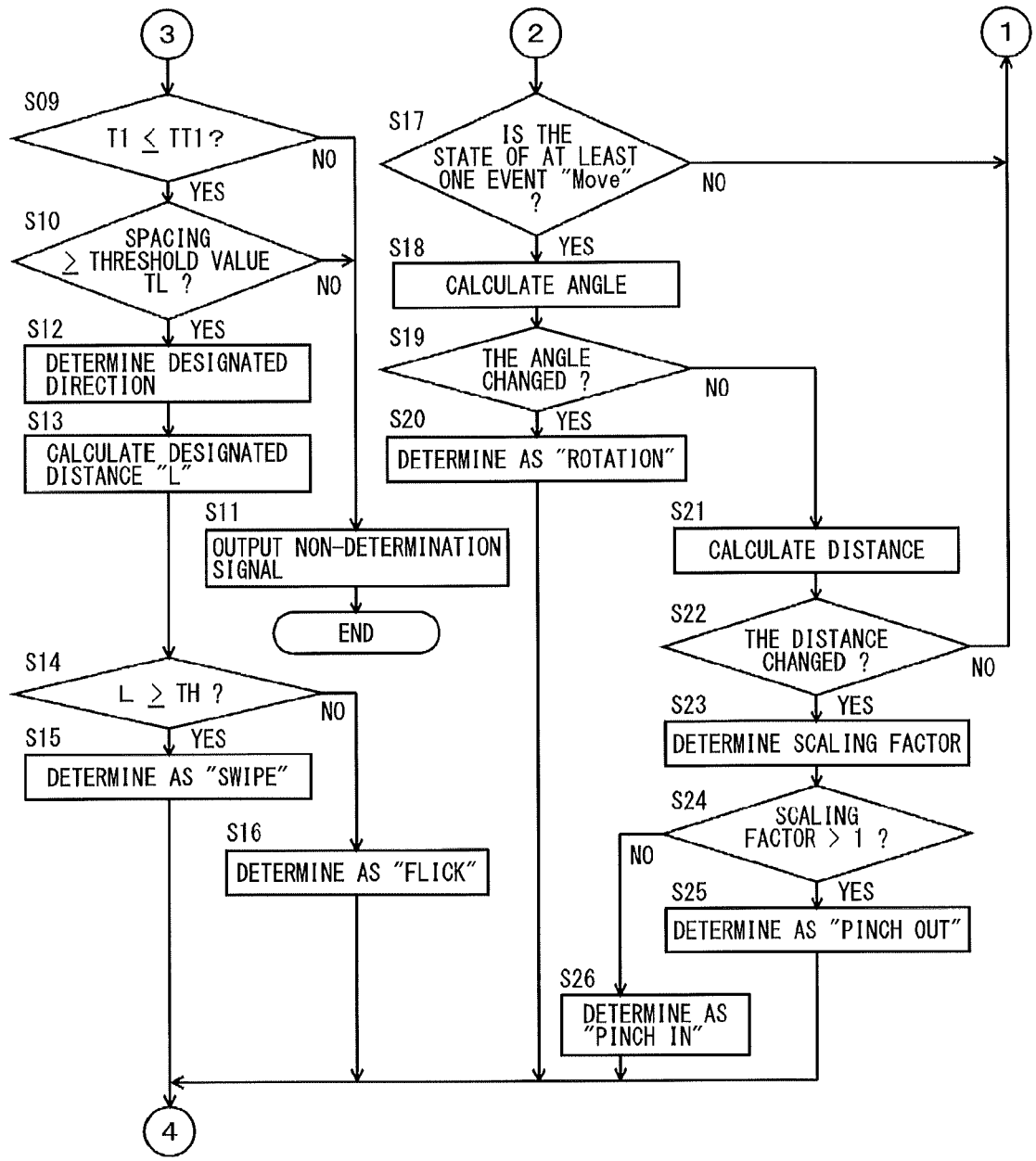

FIGS. 7A and 7B show a flowchart illustrating an example of the flow of a gesture event determining process. The gesture event determining process is carried out by CPU 111 included in MFP 100 as CPU 111 executes an operation accepting program stored in ROM 113, HDD 115, or CD-ROM 118. Referring to FIGS. 7A and 7B, CPU 111 determines whether a mouse event has been detected (step S01). If a user designates a position on touch panel 165, a mouse event is detected on the basis of the position detected by touch panel 165. CPU 111 is in a standby mode until a mouse even is detected (NO in step S01), and once a mouse event is detected (YES in step S01), the process proceeds to step S02. In other words, the gesture event determining process is executed on the condition that a user designates touch panel 165 and a mouse event is detected.

In step S02, CPU 111 determines whether a single mouse event has been detected. If a single mouse event has been detected, the process proceeds to step S03. If more than one mouse event has been detected, the process proceeds to step S17.

In step S03, the process branches in accordance with the state of the mouse event. If the state of the mouse event is "Press", the process proceeds to step S04. If the state of the mouse event is "Move", the process proceeds to step S09. If the state of the mouse event is "Release", the process proceeds to step S05. In step S04, CPU 111 starts a timer T1, and the process returns to step S01. Timer T1 counts time elapsed from the detection of the mouse event whose state is "Press".

In step S09, CPU 111 determines whether the value of timer T1 is a threshold value TT1 or less. If so, the process proceeds to step S10; otherwise, the process proceeds to step S11. In step S10, CPU 111 determines whether spacing is a threshold value TL or greater. If so, the process proceeds to step S12; otherwise, the process proceeds to step S11. The spacing is a distance between the position specified by the positional information included in the firstly detected mouse event, i.e. the mouse event whose state is "Press", and the position specified by the positional information included in the mouse event detected in step S01 most recently. In step S11, CPU 111 output a non-determination signal indicating that no gesture event is determined, and the process is terminated. That is, in the case where no mouse event designating a position at a distance of threshold value TL or greater from the position designated by the mouse event whose state is "Press" has been detected within the time of threshold value TT1 from the detection of the mouse event whose state is "Press", the process is terminated with no gesture event determined. This is to prevent any gesture event from being determined in the case where the position designated by a user is not moved within a lapse of time corresponding to the threshold value TT1. Alternatively, it may be configured to determine a gesture event that a user designates the same position for a prescribed time.

The process proceeds to step S12 when the state of the mouse event is "Move". This means that another mouse event has been input immediately before the mouse event. The state of the other mouse event may be "Press" or "Move". In step S12, CPU 111 determines a designated direction. Specifically, CPU 111 determines the direction from the position specified by the positional information included in the other mouse event input immediately before, to the position specified by the positional information included in the mouse event detected in step S01. The direction determined here is one of the left, right, up, and down directions relative to the display surface of display portion 161 that is closest to the calculated direction.

In the following step S13, CPU 111 calculates a designated distance L. Specifically, CPU 111 calculates, as the designated distance L, a distance between the position specified by the positional information included in the other mouse event input immediately before, and the position specified by the positional information included in the mouse event detected in step S01. CPU 111 then determines whether the designated distance L is not smaller than a threshold value TH (step S14). If the designated distance L is equal to or greater than the threshold value TH, the process proceeds to step S15; otherwise, the process proceeds to step S16.

In step S15, CPU 111 determines the gesture event to be "Swipe", and the process proceeds to step S27. In step S16, CPU 111 determines the gesture event to be "Flick", and the process proceeds to step S27.

The process proceeds to step S05 when the state of the mouse event detected in step S01 is "Release", in which case another mouse event has been input immediately before the mouse event. The state of the other mouse event may be "Press" or "Move". In step S05, the process branches in accordance with the state of the other mouse event input immediately before. If the state of the other mouse event input immediately before is "Press", the process proceeds to step S06; otherwise, the process returns to step S01.

In step S06, CPU 111 determines whether RAM 114 stores the same positional information as the one included in the mouse event detected in step S01. If so, the process proceeds to step S07; otherwise, the process proceeds to step S08. Here, the determination that the pieces of positional information are the same means that the distance between the two positions specified by the respective pieces of positional information is within a prescribed length. A certain margin of error is set for detecting the user operations of designating the same position.

In step S08, CPU 111 temporarily stores the positional information included in the mouse event detected in step S01, into RAM 114, and the process proceeds to step S32. The process proceeds to step S08 when the state of the mouse event input immediately before is "Press" and the state of the mouse event input subsequently is "Release", and when the same positional information has not been stored in RAM 114. In other words, the process proceeds to step S08 when a user inputs a first tap operation.

In step S07, CPU 111 determines the gesture event to be "Double Tap", and the process proceeds to step S27. The process proceeds to step S07 when the state of the mouse event input immediately before is "Press" and the state of the mouse event detected in step S01 is "Release", and when the same positional information has been stored in RAM 114. In other words, the process proceeds to step S07 when a user, following the first tap operation, taps the same position as the firstly tapped position.

The process proceeds to step S17 in the case where two mouse events are detected. In step S17, CPU 111 determines whether the state of at least one of the two mouse events is "Move". If so, the process proceeds to step S18; otherwise, the process returns to step S01.

In step S18, CPU 111 calculates an angle. Specifically, CPU 111 calculates the angle between the straight line connecting the two positions specified by the respective pieces of positional information included in the two mouse events and a prescribed reference side on the display surface of display portion 161. In the following step S19, CPU 111 determines whether the angle calculated in step S18 has been changed. It is determined that the angle has been changed if the difference between the angle calculated in step S18 and the angle calculated on the basis of another set of two mouse events input immediately before is a prescribed value or greater. If the angle has been changed, the process proceeds to step S20; otherwise, the process proceeds to step S21. In step S20, CPU 111 determines the gesture event to be "Rotation", and the process proceeds to step S27.

In step S21, CPU 111 calculates a distance. Specifically, CPU 111 calculates the distance between the two positions specified by the respective pieces of positional information included in the two mouse events. In the following step S22, CPU 111 determines whether the distance calculated in step S21 has been changed. It is determined that the distance has been changed if the difference between the distance calculated in step S21 and the distance calculated on the basis of the other set of two mouse events input immediately before is a prescribed value or greater. If the distance has been changed, the process proceeds to step S23; otherwise, the process returns to step S01.

In step S23, CPU 111 determines a scaling factor. Specifically, CPU 111 determines the value obtained by dividing the distance calculated in step S21 by the distance calculated on the basis of the other set of two mouse events input immediately before, as the scaling factor. In the following step S24, CPU 111 determines whether the scaling factor is greater than 1. If so, the process proceeds to step S25; otherwise, the process proceeds to step S26.

In step S25, CPU 111 determines the gesture event to be "Pinch Out", and the process proceeds to step S27. In step S26, CPU 111 determines the gesture event to be "Pinch In", and the process proceeds to step S27.

In step S27, CPU 111 determines whether a process corresponding to the determined gesture event has been defined. Specifically, CPU 111 determines whether the plurality of types of processes that have been determined in master table 91 stored in HDD 115 includes a process that is associated with the relevant gesture event in correspondence with the application program being set in the currently selected state. If there is a process associated with the determined gesture event in master table 91, CPU 111 determines that a process corresponding to the determined gesture event has been defined for the application program set in the currently selected state. If a process corresponding to the determined gesture event has been defined, the process proceeds to step S28; otherwise, the process proceeds to step S32. In step S32, CPU 111 outputs a non-determination signal, and the process is terminated.

In step S28, CPU 111 outputs the determined gesture event, and the process proceeds to step S29. In step S29, CPU 111 starts a timer T2. Timer T2 counts time elapsed from the output of the gesture event. In step S30, CPU 111 determines whether the value of timer T2 is a threshold value TT2 or greater. If so, the process is terminated; otherwise, the process proceeds to step S31. In step S31, CPU 111 determines whether a mouse event has been detected. If so, the process returns to step S28; otherwise, the process returns to step S30. In other words, when a mouse event is detected within the prescribed time TT2 from the output of the gesture event, CPU 111 determines that the user is continuously inputting the operation corresponding to the determined gesture event. It is noted that the determination as to whether a mouse event is input within the prescribed time TT2 may be replaced with the determination according to the state of a mouse event. In this case, if a mouse event whose state is "Move" is detected, the process returns to step S28. If a mouse event whose state is "Release" is detected, the process is terminated.

When the process proceeds from step S31 to step S28, in step S28, CPU 111 determines a parameter on the basis of the mouse event detected in step S31, and outputs a gesture event including the determined parameter. A gesture event with the gesture identification information "Swipe" and a gesture event with the gesture identification information "Flick" each include the finger's travel distance, for example, as a parameter. A gesture event with the gesture identification information "Pinch In" and a gesture event with the gesture identification information "Pinch Out" each include the distance between two points, for example, as a parameter. A gesture event with the gesture identification information "Rotation" includes the angle, for example, as a parameter.

Figure 8:
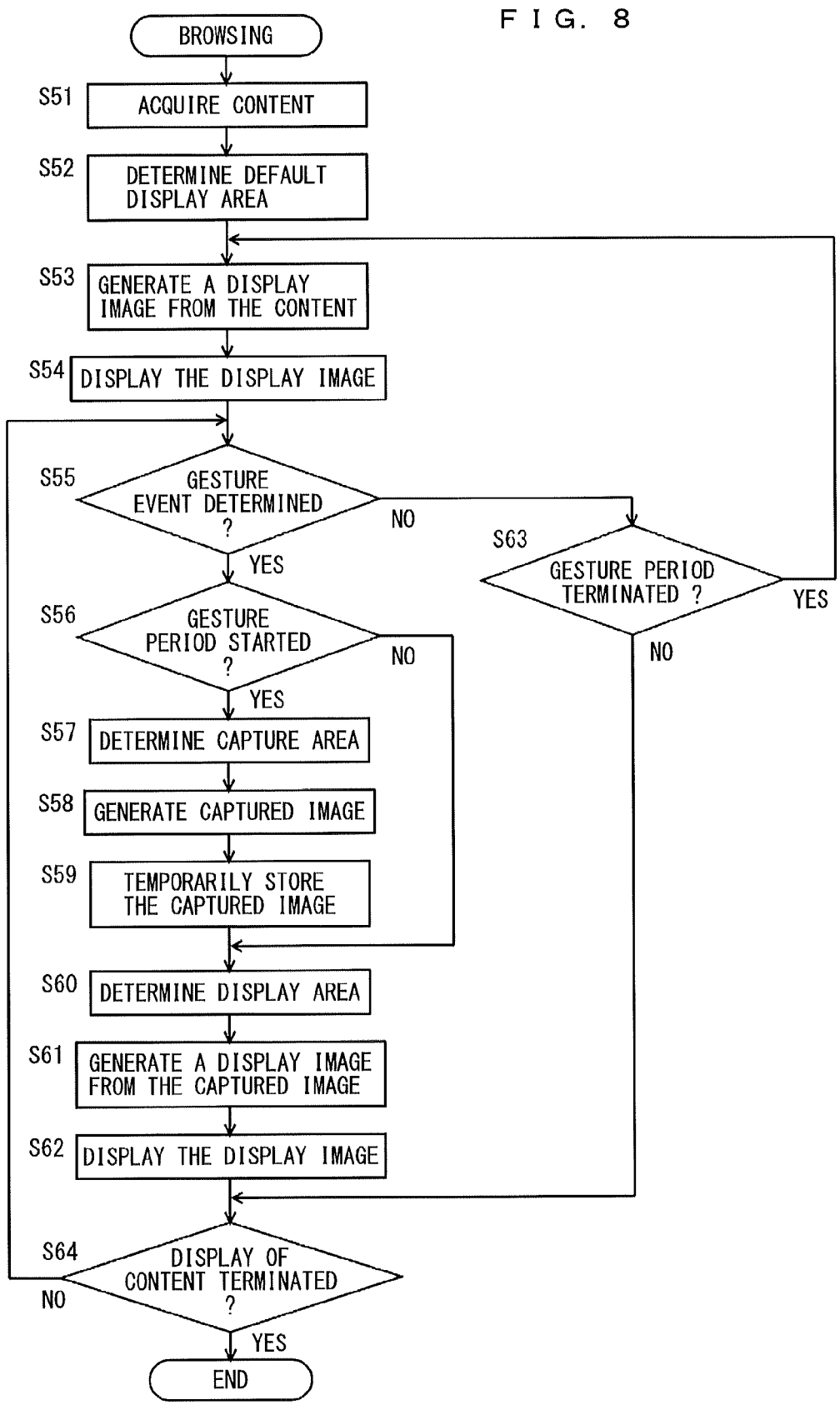
FIG. 8 is a flowchart illustrating an example of the flow of a browsing process according to the first embodiment.

FIG. 8 is a flowchart illustrating an example of the flow of a browsing process according to the first embodiment. The browsing process according to the first embodiment is carried out by CPU 111 included in MFP 100 as CPU 111 executes a browsing program stored in ROM 113, HDD 115 or CD-ROM 118. Referring to FIG. 8, CPU 111 acquires content (step S51). Specifically, CPU 111 downloads a Web page as the content, from a server connected to the Internet. The Web page is identified by a URL designated by an operation user who operates MFP 100. Alternatively, the Web page may be identified by a predetermined URL. The content is not necessarily the Web page; it may be image data.

In step S52, CPU 111 determines a default display area in the acquired content, which is here the Web page. In step S53, CPU 111 generates a display image corresponding to the display area on the basis of the content, or the Web page, acquired in step S51. CPU 111 then displays the generated display image on display portion 161 (step S54), and the process proceeds to step S55. CPU 111 stores the display image in the VRAM included in display portion 161, and displays the display image on display portion 161.

In step S55, CPU 111 determines whether a gesture event has been determined. If a gesture event is output in the above-described gesture event determining process, CPU 111 determines that the gesture event has been determined. If the gesture event has been determined, the process proceeds to step S56; otherwise, the process proceeds to step S63.

In step S56, CPU 111 determines whether a gesture period has started. If no gesture event was determined for a prescribed period of time before the determination of the gesture event in step S55, CPU 111 determines that the gesture period has started. If so, the process proceeds to step S57; otherwise, the process proceeds to step S60.

In step S57, CPU 111 determines a capture area. The display area has already been determined in step S52 prior to step S57, or in step S60 which will be described later. In step S57, CPU 111 determines an area including the display area, as the capture area. In the following step S58, CPU 111 generates a captured image corresponding to the capture area determined in step S57. Specifically, CPU 111 generates, as the captured image, an image of the area corresponding to the capture area which has been determined in step S57 from within the Web page acquired in step S51. CPU 111 then temporarily stores the generated captured image into RAM 114 (step S59), and the process proceeds to step S60.

In step S60, CPU 111 determines a display area on the basis of the gesture event determined in step S55. The display area has been determined in step S52 before step S60. In the case where step S60 has already been performed before step S60 of this time, the display area has been determined in the previously performed step S60. Therefore, in step S60, CPU 111 updates the display area which has already been determined, with a display area changed on the basis of the gesture event. For example, in the case where the gesture event determined in step S55 is a gesture event having the gesture identification information "Swipe" or a gesture event having the gesture identification information "Flick", the display area is translated to the left, right, up, or down. In the case where it is a gesture event having the gesture identification information "Pinch Out" or a gesture event having the gesture identification information "Pinch In", the display area is reduced or increased in size. In the case where it is a gesture event having the gesture identification information "Rotation", the display area is rotated.

In the following step S61, CPU 111 generates a display image on the basis of the captured image stored in RAM 114. Specifically, CPU 111 extracts an image of the display area from the captured image, and sets the extracted image, or an image obtained by zooming in or zooming out on the extracted image, or an image obtained by rotating the extracted image, as the display image. CPU 111 then displays the generated display image on display portion 161 (step S62), and the process proceeds to step S64.

On the other hand, in step S63, CPU 111 determines whether the gesture period has been terminated. When no gesture event is determined for a prescribed period of time, CPU 111 determines that the gesture period has been terminated. If so, the process returns to step S53; otherwise, the process proceeds to step S64.

In step S64, CPU 111 determines whether it has accepted an instruction to terminate the display of the content. For example, when one of a plurality of keys included in hard key portion 167 with which an instruction to terminate the browsing program has been assigned is designated, CPU 111 accepts the instruction to terminate the display of the content. If so, the process is terminated; otherwise, the process returns to step S55.

Accordingly, during the gesture period, a display image is generated on the basis of the captured image stored in RAM 114, and displayed. Further, when a gesture period is started, steps S57 to S59 are performed, so that a captured image is stored into RAM 114. As such, a captured image has been stored in RAM 114 prior to generation of a display image. Therefore, during the gesture period, there is no need to analyze the Web page to generate a display image from the Web page.

MFP 100 according to the present embodiment needs to analyze a Web page and generate a captured image only once during one gesture period. Once the captured image is generated, MFP 100 may generate a display image from the captured image each time a gesture event is determined. The process of generating a display image from a captured image is lighter in load than the process of analyzing a Web page and generating a display image from the Web page. The time required for generating a display image is thus reduced and, accordingly, the response time from when a user inputs an operation to when a display image is displayed is decreased. Particularly during the gesture period, a gesture event is determined each time a mouse event is generated, causing a lot of display images to be generated. The above-described response time can be decreased during the gesture period.

Figure 9:
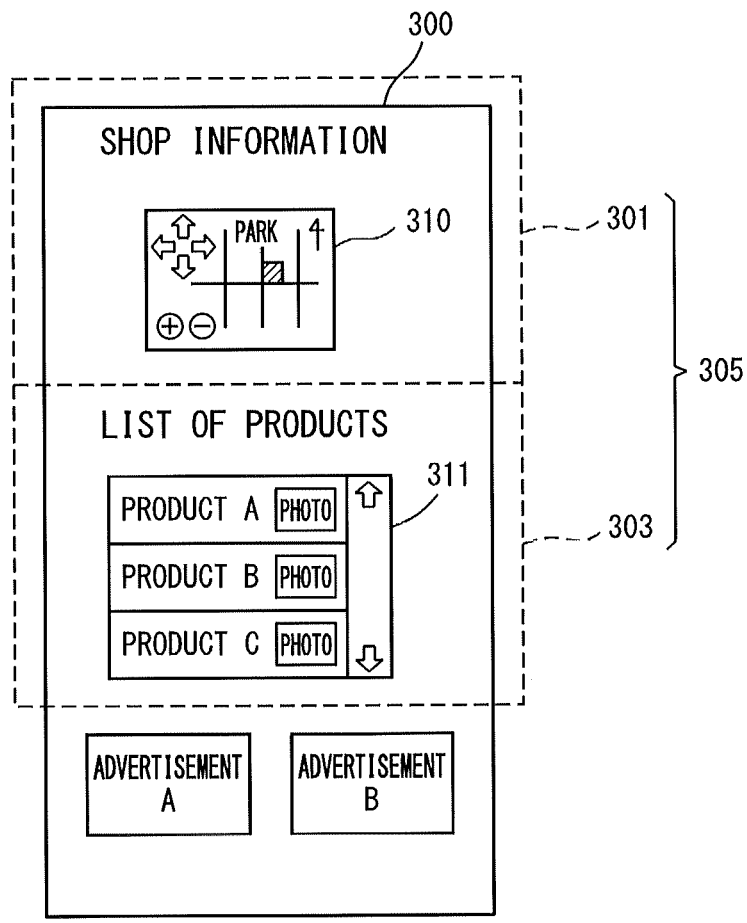
FIG. 9 shows an example of an image of an entire Web page.

FIG. 9 shows an example of an image of an entire Web page. The image of the entire Web page shown in FIG. 9 corresponds to a Web page which has been downloaded from a server connected to the Internet. It is here assumed that the Web page contains an introduction to a shop selling products.

Referring to FIG. 9, an image 300 of the entire Web page includes two embedded areas 310 and 311 in the Web page. Embedded areas 310 and 311 contain images of data linked to the downloaded Web page.

Embedded area 310 has an image of a map showing the location of the shop disposed therein. Embedded area 311 has an image showing the list of products sold by the shop disposed therein. An area 301 delimited by a dotted line shows a default display area in image 300 of the entire Web page. An area 305 as a combination of area 301 and an area 303 delimited by a dotted line shows a captured image of a capture area. It is noted that the dotted lines delimiting areas 301 and 303 are shown for illustration purposes only; the dotted lines do not exist in display image 300.

In this example, at the stage when the Web page is downloaded, a captured image of capture area 305 including areas 301 and 303 is stored into RAM 114. Therefore, original data of the images in embedded areas 310 and 311 has been downloaded as well.

Figure 10:
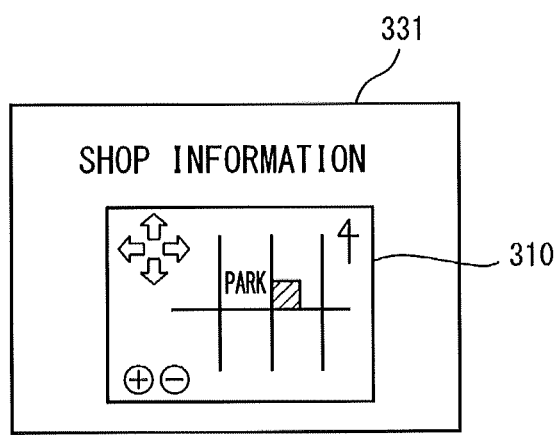

FIG. 10 shows an example of a display image. Referring to FIG. 10, a display image 331 is displayed in the case where area 301 is determined as a display area, from within image 300 of the entire Web page shown in FIG. 9. Display image 331 includes embedded area 310 disposed in image 300 of the entire Web page.

FIG. 11 shows another example of a display image. A display image 341 corresponds to the case where area 303 in image 300 of the entire Web page shown in FIG. 9 has been determined as a display area. Display image 341 includes embedded area 311 disposed in image 300 of the entire Web page. At the stage when display image 331 shown in FIG. 10 is displayed on display portion 161, when a user inputs a swipe operation, display image 341 shown in FIG. 11 is displayed on display portion 161. The display image shown in FIG. 11 is generated from capture area 305 in image 300 of the entire Web page shown in FIG. 9. The captured image of capture area 305 has been stored in RAM 114, eliminating the need to download the original data of embedded area 311. As a result, display image 341 can be generated in a shorter amount of time compared to the case where a Web page is analyzed for generating the display image.

As described above, MFP 100 according to the first embodiment is configured as follows. When MFP 100 determines a gesture event, it determines a display area on the basis of the determined gesture event, and further determines a capture area including the display area. MFP 100 analyzes the Web page which has been stored in a server, generates a captured image corresponding to the capture area, and temporarily stores the captured image in RAM 114. Thereafter, when a display area is determined on the basis of a gesture event, MFP 100 generates a display image corresponding to the display area on the basis of the captured image temporarily stored in RAM 114, and displays the display image on display portion 161. Although MFP 100 determines a display area on the basis of a gesture event and generates a display image, it generates the display image on the basis of the captured image. This can reduce the number of times for MFP 100 to analyze the Web page for generating a display image. The load of CPU 111 for performing the process of generating a display image is reduced, so that the response time from when a user has input an operation to when an image of the content is displayed can be decreased.

Further, at the time of initiation of a gesture period, MFP 100 determines a capture area including the determined display area, and temporarily stores the capture area in RAM 114. During the gesture period, whenever a display area is determined, MFP 100 generates a display image corresponding to the display area on the basis of the captured image temporarily stored in RAM 114. On the other hand, at the time when a Web page is acquired from a server prior to determination of a gesture event, or at the time when the gesture period is terminated, MFP 100 analyzes the Web page acquired from the server and generates a display image. In this manner, MFP 100 temporarily stores a captured image into RAM 114 at the time of initiation of a gesture period, and, during the gesture period, MFP 100 generates a display image corresponding to the display area on the basis of the captured image temporarily stored in RAM 114. As such, during the gesture period, the display image is generated on the basis of the captured image generated at the start of the gesture period. This can decrease the number of times of generating a display image on the basis of a Web page.

Further, MFP 100 determines the size of a capture area on the basis of the size of display portion 161, the scaling factor of a display image, and the free space on RAM 114. This ensures an effective use of the free space on RAM 114.

Furthermore, MFP 100 determines a display area by performing one of a plurality of types of processes determined by the browsing program that corresponds to the gesture event input by the user. This makes it possible to determine the display area in the manner determined by the browsing program.

<Modification>

In the first embodiment described above, MFP 100 generates a captured image at the time of initiation of a gesture period, and during the gesture period, MFP 100 generates a display image on the basis of the captured image, and displays the display image on display portion 161. An MFP 100A according to a modification is different from MFP 100 according to the first embodiment in that it generates a captured image at the time when content is acquired or at the time when a gesture period is terminated. The other functions are similar to those in MFP 100 of the first embodiment, and therefore, the differences from the first embodiment will primarily be described below.

Figure 12:
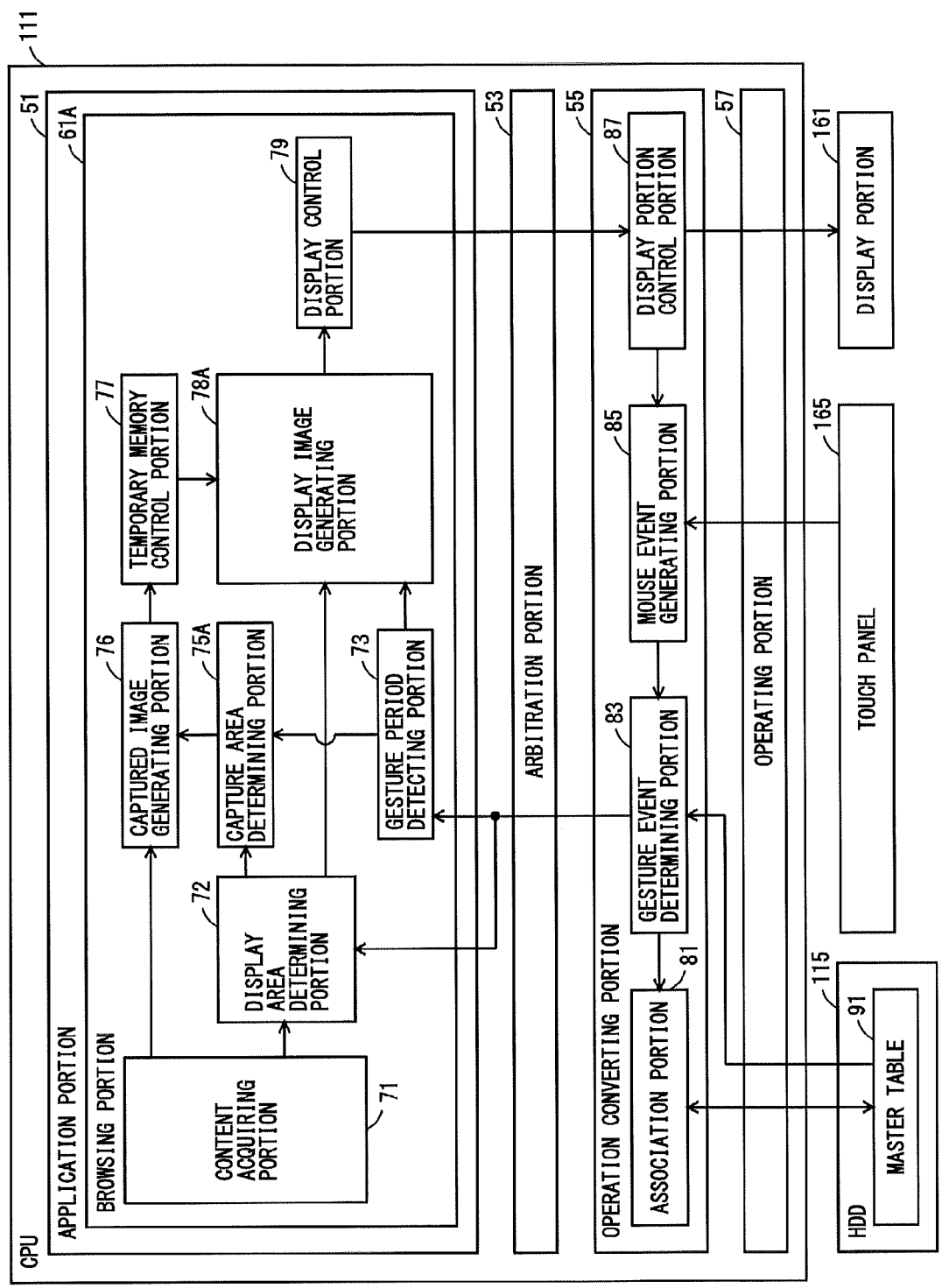
FIG. 12 is a block diagram showing, by way of example, the functions of a CPU included in an MFP according to a modification of the first embodiment, together with information stored in a HDD.

FIG. 12 is a block diagram showing, by way of example, the functions of a CPU included in the MFP according to the modification of the first embodiment, together with information stored in a HDD. Referring to FIG. 12, this differs from the functional block diagram shown in FIG. 5 in that capture area determining portion 75 and display image generating portion 78 have been changed respectively to a capture area determining portion 75A and a display image generating portion 78A. The other functions are similar to those shown in FIG. 5, and thus, a description thereof will not be repeated here.

Capture area determining portion 75A receives a display area from display area determining portion 72, and receives a gesture period signal from gesture period detecting portion 73. Capture area determining portion 75A determines a capture area including the display area received from display area determining portion 72, at the time when content has been acquired by content acquiring portion 71, and at the time when a gesture period has been terminated. Display area determining portion 72 outputs a display area at the time when content has been acquired by content acquiring portion 71 and at the time when a gesture event is input from gesture event determining portion 83. In the case where capture area determining portion 75A receives a display area from display area determining portion 72 during the period in which no gesture period signal is input from gesture period detecting portion 73, capture area determining portion 75A determines a capture area including the display area. Following the state where the gesture period signals are input from gesture period detecting portion 73, when the input of the gesture period signal has ceased, capture area determining portion 75A determines the time when the last gesture period signal was received, as the time of termination of the gesture period. At the time of termination of the gesture period, capture area determining portion 75A determines a capture area including the display area received from display area determining portion 72.

The capture area is at least a part of an image of content, and includes a display area. The capture area has an area greater than that of the display area. The method for determining a capture area is not particularly limited; the position and size of a capture area can be determined arbitrarily. The manner in which capture area determining portion 75A determines a capture area is identical to the manner in which the above-described capture area determining portion 75 determines a capture area. Therefore, a description thereof will not be repeated here.

Display image generating portion 78A receives a display area from display area determining portion 72, a gesture period signal from gesture period detecting portion 73, and the file name of a captured image from temporary memory control portion 77. Display image generating portion 78A generates a display image corresponding to the display area, on the basis of the captured image stored in RAM 114. Specifically, display image generating portion 78A reads from RAM 114 the captured image corresponding to the file name input from temporary memory control portion 77, and extracts, from the read captured image, an area specified by the display area input from display area determining portion 72 during the gesture period, as a display image.

Display image generating portion 78A generates a display image at the time when content is acquired by content acquiring portion 71, at the time when a gesture event is determined during the gesture period, and at the time when the gesture period is terminated. Display image generating portion 78A outputs the generated display image to display control portion 79. The captured image stored in RAM 114 at the time when content has been acquired by content acquiring portion 71 is an image corresponding to the capture area that has been determined by capture area determining portion 75A at the time of acquisition of the content by content acquiring portion 71. The captured image stored in RAM 114 during the gesture period is an image corresponding to the capture area that has been determined by capture area determining portion 75A at the end of a gesture period previous to the gesture period. The captured image stored in RAM 114 at the time when a gesture period is terminated is an image corresponding to the capture area that has been determined by capture area determining portion 75A at the time of termination of the gesture period.

In MFP 100A according to the modification, at the time point when a Web page is acquired, and at the time point when a gesture period is terminated, a captured image generated by captured image generating portion 76 is stored into RAM 114 by temporary memory control portion 77. Therefore, at the time when the Web page is acquired, display image generating portion 78A generates a display image on the basis of the captured image that has been generated by captured image generating portion 76 at the time of acquisition of the Web page. Whenever a gesture event is determined, display image generating portion 78A generates a display image on the basis of the captured image that has been generated by captured image generating portion 76 at the end of a gesture period previous to the gesture period to which the gesture event belongs. Further, at the time when a gesture period is terminated, display image generating portion 78A generates a display image on the basis of the captured image that has been generated by captured image generating portion 76 at the time of termination of the gesture period. As such, a captured image has been stored in RAM 114 before display image generating portion 78A generates a display image. This saves the time required to determine a capture area and generate a captured image.

Figure 13:
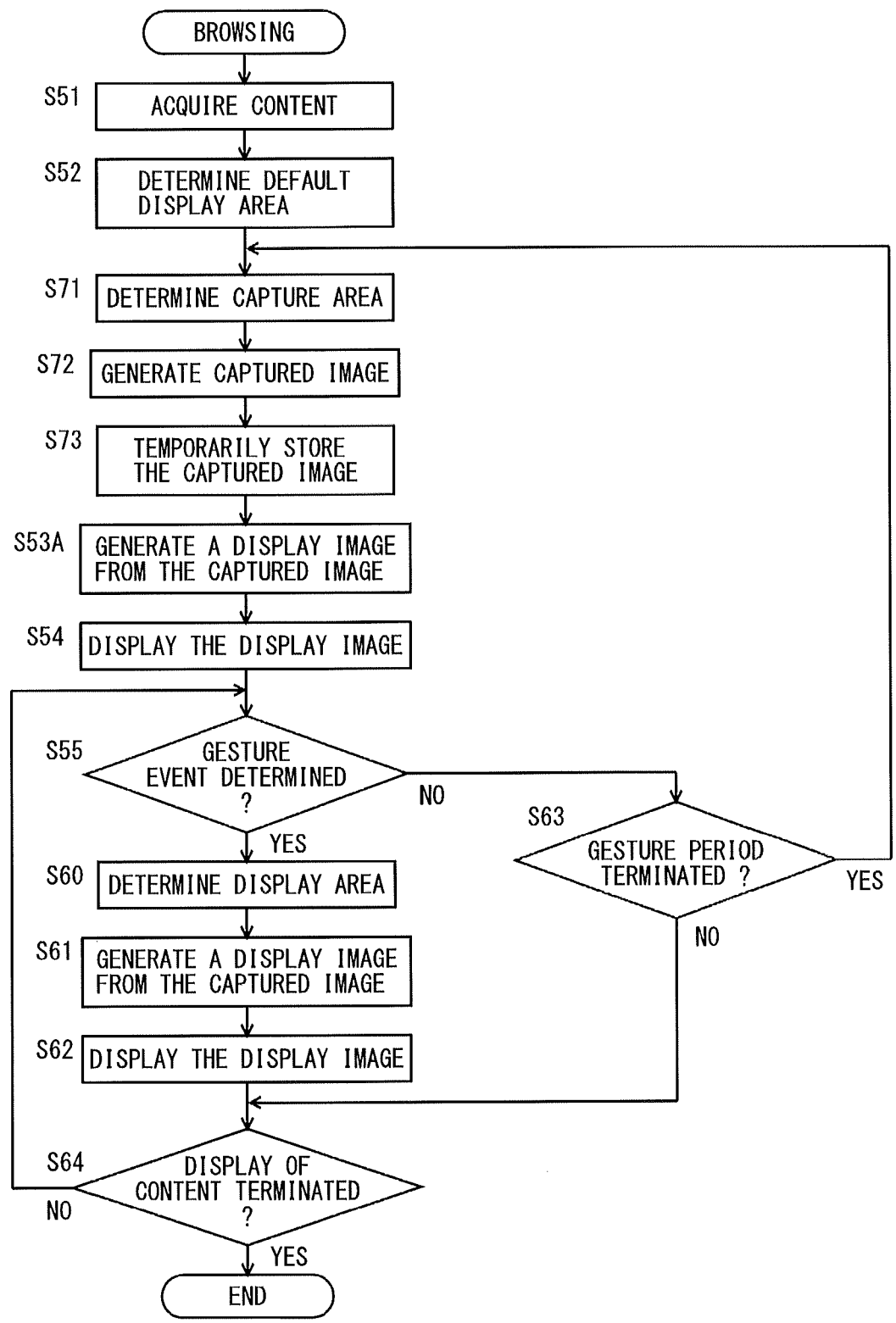
FIG. 13 is a flowchart illustrating an example of the flow of a browsing process according to the modification of the first embodiment.

FIG. 13 is a flowchart illustrating an example of the flow of a browsing process according to the modification of the first embodiment. Referring to FIG. 13, the browsing process according to the modification differs from the browsing process according to the first embodiment, shown in FIG. 8, in that step S53 has been changed to step S53A, steps S71 to S73 have been added between steps S52 and S53A, and steps S56 to S59 have been deleted. The other steps are identical to those shown in FIG. 8, and thus, a description thereof will not be repeated here.

After a display area is determined in step S52, a capture area is determined in step S71. CPU 111 determines an area including the display area which has been determined in step S52, or, if step S60 which will be described later is performed, an area including the display area which has been determined in step S60, as the capture area.

In the following step S72, CPU 111 generates a captured image corresponding to the capture area determined in step S71. Specifically, CPU 111 generates an image of a part of the Web page acquired in step S51, corresponding to the capture area determined in step S71, as the captured image. CPU 111 then temporarily stores the generated captured image in RAM 114 (step S73), and the process proceeds to step S53A.

In step S53A, CPU 111 generates a display image on the basis of the captured image stored in RAM 114 in step S73. Specifically, CPU 111 extracts an image of the display area from the captured image, and sets the extracted image as it is, an image obtained by zooming in or zooming out on the extracted image, or an image obtained by rotating the extracted image, to the display image. CPU 111 then displays the generated display image on display portion 161 (step S54), and the process proceeds to step S55.

In step S55, CPU 111 determines whether a gesture event has been determined. If so, the process proceeds to step S60; otherwise, the process proceeds to step S63.

In step S60, CPU 111 determines a display area on the basis of the gesture event determined in step S55. In the following step S61, CPU 111 generates a display image on the basis of the captured image stored in RAM 114. CPU 111 then displays the generated display image on display portion 161 (step S62), and the process proceeds to step S64.

Accordingly, during the gesture period, a display image is generated on the basis of the captured image stored in RAM 114, and displayed.

Further, when the process proceeds from step S52 to step S71, a captured image is stored in RAM 114 at the time when a Web page is acquired. When the process proceeds from step S63 to step S71, a captured image is stored in RAM 114 at the time when the gesture period is terminated. Therefore, when a Web page is acquired, a display image is generated on the basis of the captured image generated from the Web page at that time point. During the gesture period, a display image is generated on the basis of the captured image generated from the Web page at the end of the preceding gesture period. As such, a captured image has been stored in RAM 114 prior to generation of a display image. Therefore, during the gesture period, there is no need to determine a capture area and generate a captured image. This can reduce the time required for generating a display image and, hence, the response time from when a user inputs an operation to when a display image is displayed.

As described above, MFP 100A according to the modification of the first embodiment is configured as follows. At the time point when a Web page stored in a server is acquired, MFP 100A determines a capture area including the display area determined at that time. At the time point when a gesture period is terminated, MFP 100A determines a capture area including the display area determined at that time. Therefore, MFP 100A temporarily stores a captured image into RAM 114 at the time point when a Web page is acquired or at the time point when a gesture period is terminated. During the gesture period, MFP 100A generates a display image corresponding to the display area, on the basis of the temporarily stored captured image. As such, during the gesture period, a display image is generated on the basis of the captured image that has been generated before the start of the gesture period. This eliminates the need to generate a display image on the basis of the content during the gesture period.

Second Embodiment

In the first embodiment described above, MFP 100 acquired a Web page as content. An MFP 100B according to the second embodiment is different from MFP 100 according to the first embodiment and MFP 100A according to the modification thereof in that, while MFPs 100 and 100A each acquire an entire Web page, MFP 100B determines an image such as a map as content and acquires a part of the content. The differences from MFP 100A according to the modification of the first embodiment will primarily be described below.

Figure 14:
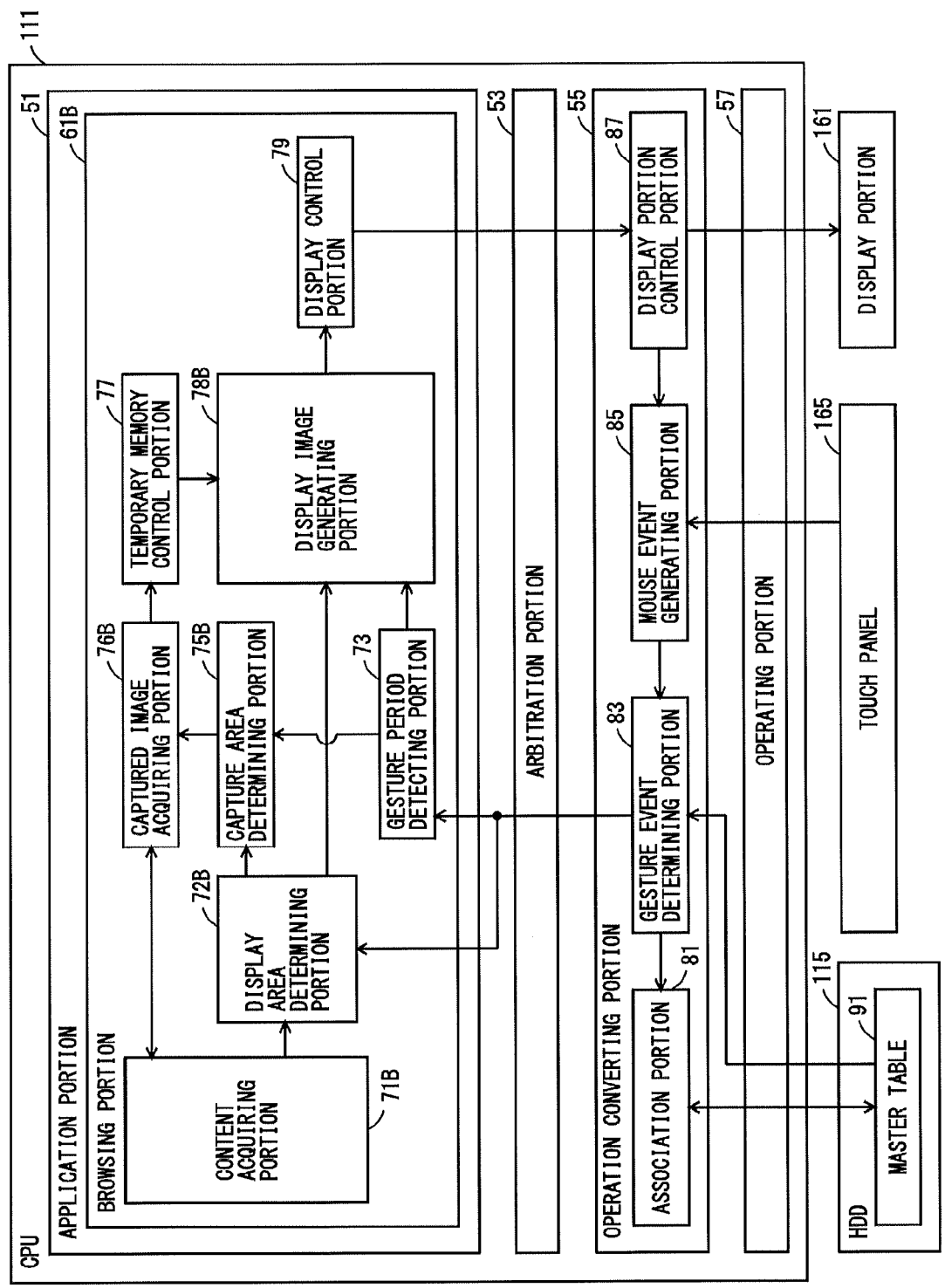
FIG. 14 is a block diagram showing, by way of example, the functions of a CPU included in an MFP according to a second embodiment, together with information stored in a HDD.

FIG. 14 is a block diagram showing, by way of example, the functions of a CPU included in the MFP according to the second embodiment, together with information stored in a HDD. Referring to FIG. 14, this differs from the functional block diagram shown in FIG. 12 in that content acquiring portion 71, display area determining portion 72, capture area determining portion 75A, captured image generating portion 76, and display image generating portion 78A have been changed to a content acquiring portion 71B, a display area determining portion 72B, a capture area determining portion 75B, a captured image acquiring portion 76B, and a display image generating portion 78B. The other functions are similar to those shown in FIG. 12, and thus, a description thereof will not be repeated here.

Content acquiring portion 71B acquires a part of content stored in a server connected to the Internet. Content acquiring portion 71B transmits a transmitting request including positional information for specifying a part of the content to the server, and acquires a part of the content specified by the positional information from the server. For the purpose of illustration; it is here assumed that an image of a map is stored as the content in a server.

Display area determining portion 72B determines at least a part of the content stored in the server as a display area. Immediately after the start of a browsing program, display area determining portion 72B determines a default area in the content stored in the server as the display area. The default display area may be determined by a server, or by the content stored in the server.

In the case where gesture events are input from gesture event determining portion 83, display area determining portion 72B determines a display area each time a gesture event is input. Display area determining portion 72B outputs the determined display area to capture area determining portion 75B. A display area is a rectangular region, which is specified by a pair of diagonal points. Therefore, a display area includes the coordinates of the pair of diagonal points in an image of content.

Capture area determining portion 75B receives a display area from display area determining portion 72B, and a gesture period signal from gesture period detecting portion 73. Capture area determining portion 75B determines a capture area including the display area received from display area determining portion 72B, at the time when a browsing program is started, and at the time when a gesture period is terminated. Display area determining portion 72B outputs a display area immediately after the browsing program is started and at the time when a gesture event is input from gesture event determining portion 83. In the case where capture area determining portion 75B receives a display area from display area determining portion 72B during the period in which no gesture period signal is input from gesture period detecting portion 73, capture area determining portion 75B determines a capture area including the display area. Following the state where the gesture period signals are input from gesture period detecting portion 73, when the input of the gesture period signal has ceased, capture area determining portion 75B determines the time when the last gesture period signal was received, as the time of termination of the gesture period. At the time of termination of the gesture period, capture area determining portion 75B determines a capture area including the display area received from display area determining portion 72B.

The capture area is at least a part of an image of content, and includes a display area. The capture area has an area greater than that of the display area. The method for determining a capture area is not particularly limited; the position and size of a capture area can be determined arbitrarily. The manner in which capture area determining portion 75B determines a capture area is identical to the manner in which capture area determining portion 75 according to the first embodiment determines a capture area. Therefore, a description thereof will not be repeated here.

Captured image acquiring portion 76B receives a capture area from capture area determining portion 75B, and outputs the capture area to content acquiring portion 71B to cause it to acquire a captured image which is an image of the capture area of the content. When content acquiring portion 71B receives the capture area from captured image acquiring portion 76B, content acquiring portion 71B transmits a transmitting request including positional information for specifying the capture area to a server, and acquires from the server the captured image which is the image of the capture area of the content. Content acquiring portion 71B outputs the acquired captured image of the content to captured image acquiring portion 76B, which in turn outputs the acquired captured image to temporary memory control portion 77. Capture area determining portion 75B determines a capture area at the time when a browsing program is started and at the time when a gesture period is terminated. Accordingly, captured image acquiring portion 76B acquires a captured image at the time when the browsing program is started and at the time when the gesture period is terminated.

Display image generating portion 78B receives a display area from display area determining portion 72B, a gesture period signal from gesture period detecting portion 73, and the file name of a captured image from temporary memory control portion 77. Display image generating portion 78B generates a display image corresponding to the display area on the basis of the captured image stored in RAM 114. Specifically, display image generating portion 78B reads from RAM 114 the captured image corresponding to the file name input from temporary memory control portion 77, and extracts, from the read captured image, an area specified by the display area input from display area determining portion 72B during the gesture period, as the display image.

Display image generating portion 78B generates a display image at the time when the browsing program is started, at the time when a gesture event is determined during a gesture period, and at the time when the gesture period is terminated. Display image generating portion 78B outputs the generated display image to display control portion 79. The captured image stored in RAM 114 at the time when the browsing program is started is an image corresponding to the capture area that has been determined by capture area determining portion 75B at the start of the browsing program. The captured image stored in RAM 114 during the gesture period is an image corresponding to the capture area that has been determined by capture area determining portion 75B at the end of a gesture period previous to the gesture period. The captured image stored in RAM 114 at the time when a gesture period is terminated is an image corresponding to the capture area that has been determined by capture area determining portion 75B at the time of termination of the gesture period.

In MFP 100B according to the second embodiment, at the time point when a browsing program is started, and at the time point when a gesture period is terminated, a captured image acquired from a server by captured image acquiring portion 76B is stored into RAM 114 by temporary memory control portion 77. Therefore, at the time point when the browsing program is started, display image generating portion 78B generates a display image on the basis of the captured image that has been received from the server by captured image acquiring portion 76B. Whenever a gesture event is determined, display image generating portion 78B generates a display image on the basis of the captured image that has been received from the server by captured image acquiring portion 76B at the end of a gesture period previous to the gesture period to which the gesture event belongs. Further, at the time when a gesture period is terminated, display image generating portion 78B generates a display image on the basis of the captured image that has been received from the server by captured image acquiring portion 76B at the time of termination of the gesture period. Accordingly, at the stage when display image generating portion 78B generates a display image, there is no need to acquire a captured image from a server.

Figure 15:
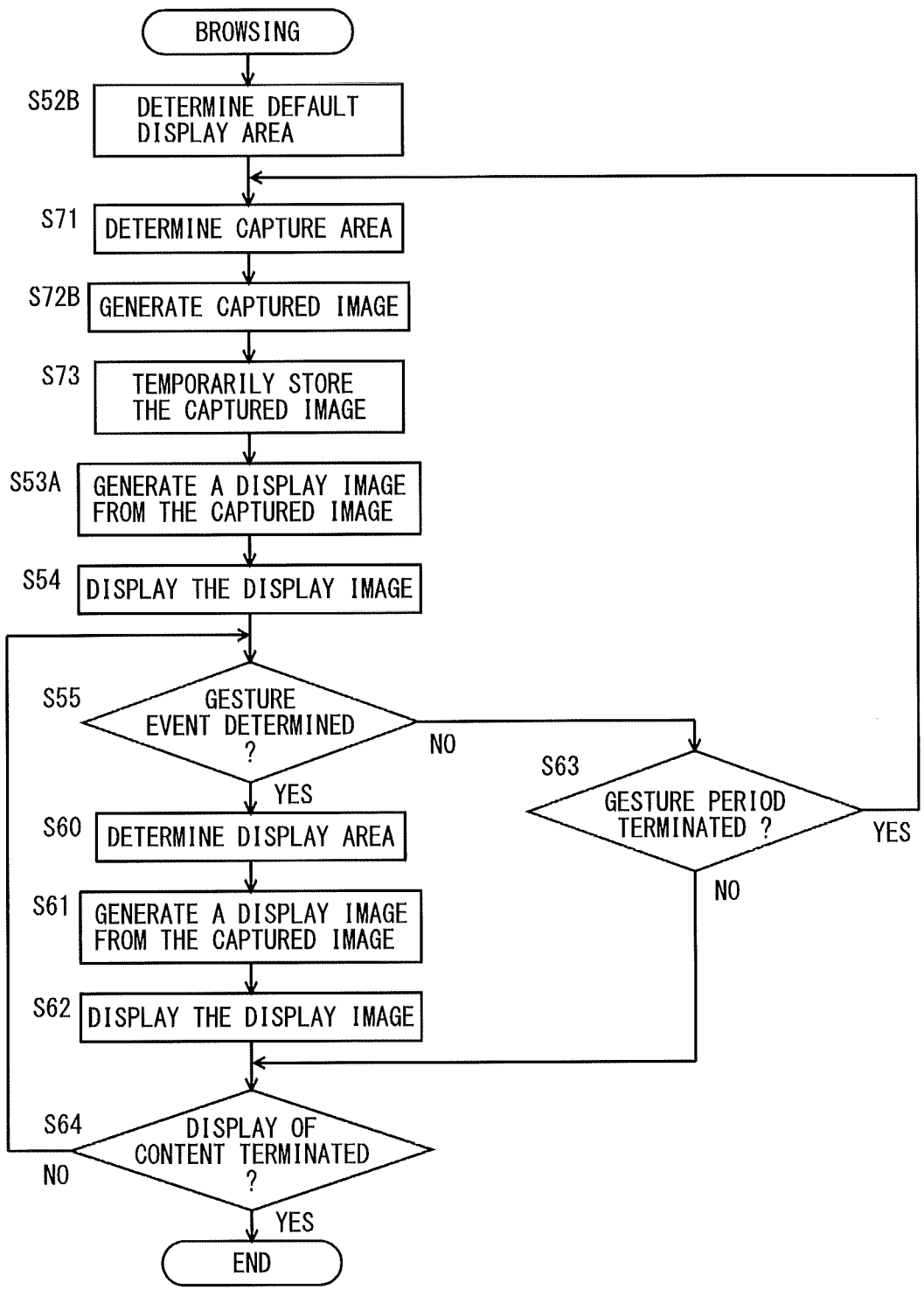
FIG. 15 is a flowchart illustrating an example of the flow of a browsing process according to the second embodiment.

FIG. 15 is a flowchart illustrating an example of the flow of a browsing process according to the second embodiment. Referring to FIG. 15, the browsing process according to the second embodiment differs from the browsing process according to the modification of the first embodiment, shown in FIG. 13, in that step S51 has been deleted, and steps S52 and S72 have been changed respectively to steps S52B and S72B. The other steps are identical to those shown in FIG. 13, and thus, a description thereof will not be repeated here.

In step S52B, CPU 111 determines a default display area. CPU 111 determines an area predetermined by the browsing program, or by the content stored in the server, as the display area.

After the display area is determined in step S52B, a capture area is determined in step S71. CPU 111 determines an area including the display area determined in step S52B, or, if step S60 is performed, an area including the display area determined in step S60, as the capture area.

In the following step S72B, CPU 111 acquires from the server a captured image corresponding to the capture area determined in step S71. Specifically, CPU 111 transmits a transmitting request including positional information for specifying the capture area to the server, and acquires a part of the content that the server has transmitted, as the captured image. CPU 111 then temporarily stores the captured image acquired in step S72B, into RAM 114 (step S73), and the process proceeds to step S53A.

In MFP 100B according to the second embodiment, like in MFP 100A according to the modification of the first embodiment, during a gesture period, a display image is generated on the basis of the captured image stored in RAM 114, and displayed.

Further, when the process proceeds from step S52B to step S71, a captured image is stored into RAM 114 at the time when a browsing program is started. When the process proceeds from step S63 to step S71, a captured image is stored into RAM 114 at the time when the gesture period is terminated. Therefore, at the time when the browsing program is started, a display image is generated on the basis of the captured image received from the server at that time point. During the gesture period, a display image is generated on the basis of the captured image received from the server at the end of the preceding gesture period. As such, a captured image has been stored in RAM 114 prior to generation of a display image. Therefore, during the gesture period, there is no need to determine a capture area and generate a captured image. This can reduce the time required for generating a display image and, hence, the response time from when a user inputs an operation to when a display image is displayed.

Figure 16:
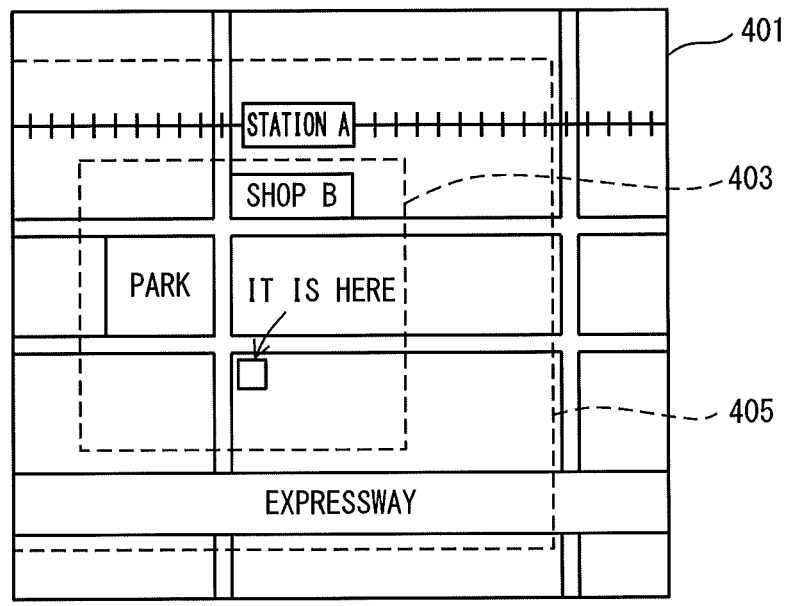
FIG. 16 shows an example of image data of a map stored in a server.

FIG. 16 shows an example of image data of a map stored in a server. Referring to FIG. 16, an image 401 of the map includes areas 403 and 405 which are delimited by dotted lines. Area 403 is a default display area in the map. Area 405 is a capture area corresponding to area 403 which is the display area. In this example, at the time point when MFP 100B downloads the map from the server, area 405 as the capture area is downloaded and stored into RAM 114, while area 403 is displayed on display portion 161.

Figure 17:
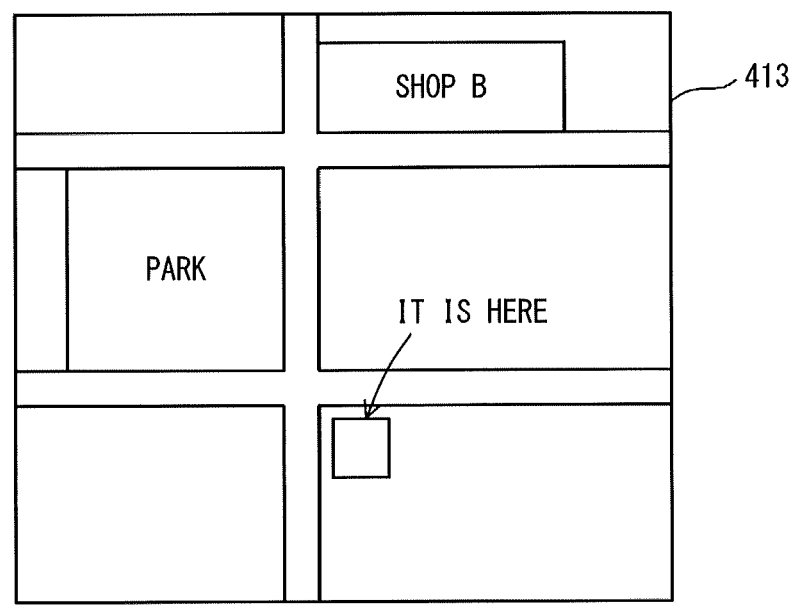
FIG. 17 shows an example of a display image displayed by default.

FIG. 17 shows an example of a display image displayed by default. Referring to FIG. 17, a display image 413 corresponds to default display area 403 in image 401 of the map shown in FIG. 16. If a user inputs a pinch-in operation in the state where display image 413 is displayed on display portion 161, an image obtained by reducing display image 413 in size is displayed on display portion 161.

Figure 18:
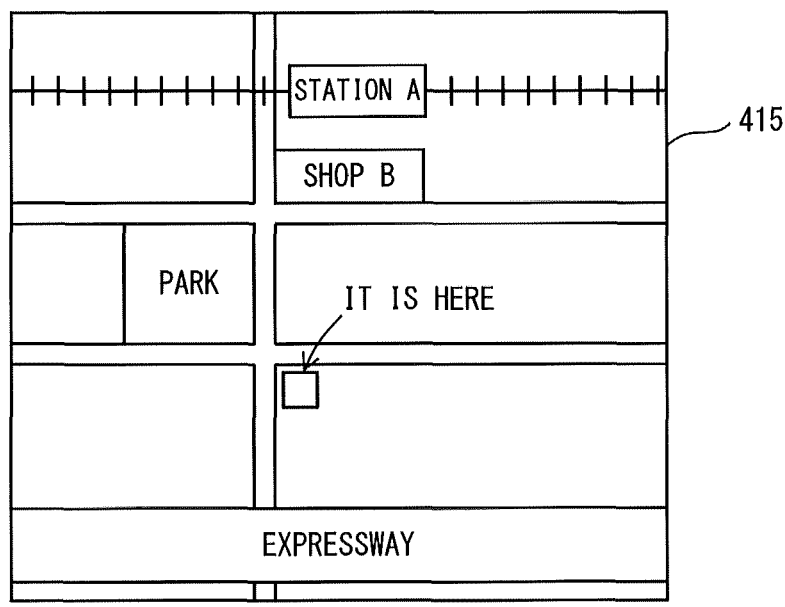
FIG. 18 shows an example of a display image after a pinch-in operation.

FIG. 18 shows an example of a display image after a pinch-in operation. In this case, according to the present embodiment, at the stage when a new display image is about to be generated, captured image 405 shown in FIG. 16 has been stored in RAM 114. Accordingly, MFP 100B of the present embodiment generates a display image on the basis of captured image 405. There is no need to download from the server an area other than display area 403 that has been displayed till then. This can reduce the response time from when a user inputs a pinch-in operation to when a new display image is displayed.

Figure 19:
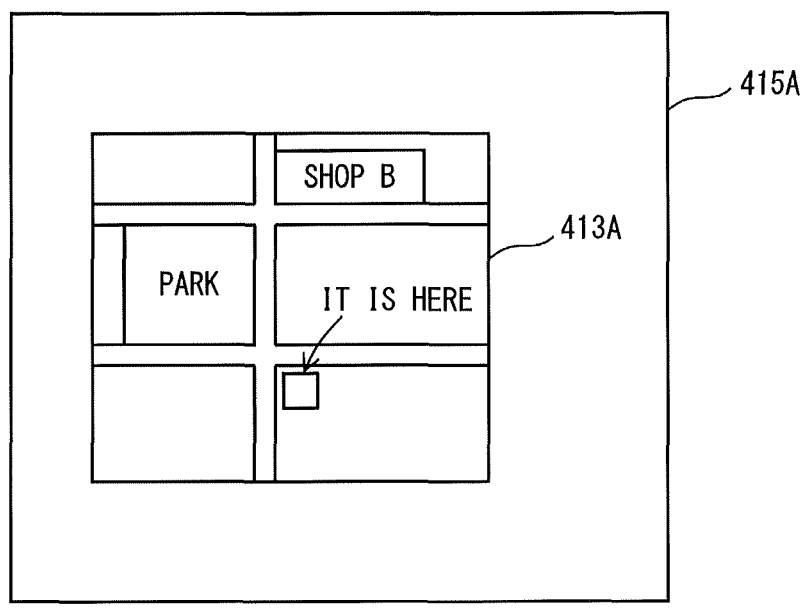
FIG. 19 shows an example of a display image after a pinch-in operation in the case where no captured image is generated.

FIG. 19 shows an example of a display image after a pinch-in operation in the case where no captured image is generated. Referring to FIG. 19, an image 413A obtained by reducing in size the display image 413 that has been displayed on display portion 161 before the pinch-in operation is displayed on display portion 161. Nothing is displayed around this image 413A until an image of the area surrounding display area 403 is downloaded from the server.

As described above, MFP 100B according to the second embodiment is configured as follows. MFP 100B determines a capture area including a display area, at a time point prior to acquisition of a part of a map stored in a server. MFP 100B acquires, from the map stored in the server, a captured image corresponding to the capture area, and temporarily stores the acquired captured image into RAM 114. When a gesture event is determined, MFP 100B determines a display area on the basis of the determined gesture event. During a gesture period, MFP 100B generates a display image corresponding to the display area on the basis of the captured image temporarily stored in RAM 114, and displays the display image on display portion 161. That is, while MFP 100B determines a display area on the basis of a gesture event and generates a display image, during the gesture period, MFP 100B generates a display image on the basis of the captured image. Therefore, during the gesture period, there is no need to acquire a part of the map from the server for generating a display image. That is, no content is acquired from the server during the gesture period. This can reduce the response time from when a user inputs an operation to when an image of the content is displayed.

While MFPs 100, 100A, and 100B have been described as examples of the data processing apparatus in the above embodiments, the present invention may of course be understood as a content displaying method for causing CPU 111 controlling MFP 100, 100A, or 100B to perform the processing shown in FIG. 8, 13, or 15, or as a browsing program for causing CPU 111 to perform the content displaying method.

Although the present invention has been described and illustrated in detail, it is clearly understood that the same is by way of illustration and example only and is not to be taken by way of limitation, the spirit and scope of the present invention being limited only by the terms of the appended claims.

APPENDIX (1) The data processing apparatus according to claim 5 or 10, wherein when the size of said display portion is represented by S, the scaling factor of said display image is represented by b, and the free space in said memory is represented by m, said size determining portion determines the size of said capture area to a value obtained by multiplying a largest integer n of not greater than m/(b*S) by S.

(2) The data processing apparatus according to any of claims 1 to 11 and (1) above, wherein in the case where said display area has a size in a vertical direction not smaller than a size in a vertical direction of said image of the content, said capture area determining portion determines said capture area to have a shape obtained by enlarging said display area in a horizontal direction.

(3) The data processing apparatus according to any of claims 1 to 11, (1), and (2) above, wherein in the case where said display area has a size in a horizontal direction not smaller than a size in a horizontal direction of said image of the content, said capture area determining portion determines said capture area to have a shape obtained by enlarging said display area in a vertical direction.

(4) The data processing apparatus according to claim 6 or 11, wherein said control portion further includes an association portion operable, at the stage when said browsing program is installed, to associate each of said plurality of types of processes determined by said browsing program with one of a plurality of gesture events in correspondence with said browsing program, and a mouse event generating portion operable, in response to detection of one or more positions by said position detecting portion, to generate mouse event(s) each including positional information indicating the corresponding one of said one or more positions, and said gesture event determining portion determines said gesture event on the condition that the gesture event corresponding to a set of one or more mouse events generated by said mouse event generating portion is associated with one of said plurality of types of processes by said association portion in correspondence with said browsing program.

What is claimed is:

1. A data processing apparatus including
a display portion capable of displaying an image,
a position detecting portion capable of detecting one or more positions designated by a user on a display surface of said display portion, and
a control portion,
said control portion comprising:
    a browsing portion to execute a browsing program and display on said display portion a display area which is at least a part of externally stored content; and
    a gesture event determining portion operable, in response to detection of the one or more positions by said position detecting portion, to determine one gesture event of a plurality of gesture events on a basis of said one or more positions;
said browsing portion including
    a display area determining portion to determine said display area on a basis of the gesture event determined by said gesture event determining portion,
    a capture area determining portion to determine a capture area including the display area determined by said display area determining portion,
    a captured image generating portion operable, in response to determination of said capture area, to generate a captured image corresponding to said determined capture area on a basis of said externally stored content,
    a temporary memory control portion to temporarily store said generated captured image,
    a display image generating portion to generate a display image corresponding to said determined display area on a basis of said temporarily stored generated captured image, and
    a display control portion to display said generated display image on said display portion.

2. The data processing apparatus according to claim 1, wherein
at a time of initiation of a gesture period in which gesture events are determined continuously by said gesture event determining portion, said capture area determining portion determines the capture area including the display area determined by said display area determining portion, and
during said gesture period, said display image generating portion generates the display image corresponding to said determined display area on a basis of said temporarily stored generated captured image, and at a time point prior to determination of the gesture event by said gesture event determining portion or at a time of termination of said gesture period, said display image generating portion generates said display image on a basis of said externally stored content.

3. The data processing apparatus according to claim 1, wherein said capture area determining portion determines the capture area including the display area determined by said display area determining portion at a time point when said externally stored content has been acquired or at a time point when a gesture period during which gesture events are determined continuously by said gesture event determining portion is terminated.

4. The data processing apparatus according to claim 1, wherein said display area determining portion determines a default display area before the gesture event is determined by said gesture event determining portion.

5. The data processing apparatus according to claim 1, further comprising a memory for said temporary memory control portion to temporarily store said captured image, wherein
- said capture area determining portion includes a size determining portion to determine a size of said capture area on a basis of a size of said display portion, a scaling factor of said display image, and free space in said memory.

6. The data processing apparatus according to claim 1, wherein in response to determination of the gesture event by said gesture event determining portion, said display area determining portion determines said display area by performing one of a plurality of types of processes determined by said browsing program that corresponds to said determined gesture event.

7. The data processing apparatus according to claim 1, wherein
- in a case where a gesture period in which gesture events are determined continuously by said gesture event determining portion terminates, said capture area determining portion determines the capture area including the display area determined by said display area determining portion, and
- during another gesture period next to said gesture period, said display image generating portion generates the display image on a basis of the captured image corresponding to the capture area determined in a case where said gesture period terminates.

8. A data processing apparatus including
a display portion capable of displaying an image,
a position detecting portion capable of detecting one or more positions designated by a user on a display surface of said display portion, and
a control portion,
said control portion comprising:
- a browsing portion to execute a browsing program and display on said display portion a display area which is at least a part of externally stored content; and
- a gesture event determining portion operable, in response to detection of the one or more positions by said position detecting portion, to determine one gesture event of a plurality of gesture events on a basis of said one or more positions;
said browsing portion including
- a display area determining portion to determine said display area on a basis of the gesture event determined by said gesture event determining portion,
- a capture area determining portion operable, at a time point prior to acquisition of the part of said externally stored content, to determine a capture area including the display area determined by said display area determining portion,
- a captured image acquiring portion operable, in response to determination of said capture area, to acquire a captured image corresponding to said determined capture area from said externally stored content,
- a temporary memory control portion to temporarily store said acquired captured image,
- a display image generating portion operable, during a gesture period in which gesture events are determined continuously by said gesture event determining portion, to generate a display image corresponding to said determined display area on a basis of said temporarily stored captured image, and
- a display control portion to display said generated display image on said display portion.

9. The data processing apparatus according to claim 8, wherein said capture area determining portion determines said capture area in response to termination of said gesture period.

10. The data processing apparatus according to claim 8, wherein said display area determining portion determines a default display area before the gesture event is determined by said gesture event determining portion.

11. The data processing apparatus according to claim 8, further comprising a memory for said temporary memory control portion to temporarily store said captured image, wherein
- said capture area determining portion includes a size determining portion to determine a size of said capture area on a basis of a size of said display portion, a scaling factor of said display image, and free space in said memory.

12. The data processing apparatus according to claim 8, wherein in response to determination of the gesture event by said gesture event determining portion, said display area determining portion determines said display area by performing one of a plurality of types of processes determined by said browsing program that corresponds to said determined gesture event.

13. The data processing apparatus according to claim 8, wherein
- in a case where the gesture period in which the gesture events are determined continuously by said gesture event determining portion terminates, said capture area determining portion determines the capture area including the display area determined by said display area determining portion, and
- during another gesture period next to said gesture period, said display image generating portion generates the display image on a basis of the captured image corresponding to the capture area determined in a case where said gesture period terminates.

14. A content displaying method performed by a data processing apparatus,
said data processing apparatus including
a display portion capable of displaying an image,
a position detecting portion capable of detecting one or more positions designated by a user on a display surface of said display portion, and
a gesture event determining portion operable, in response to detection of the one or more positions by said position detecting portion, to determine one gesture event of a plurality of gesture events on a basis of said one or more positions,
the method causing said data processing apparatus to perform a browsing step of executing a browsing program, acquiring content from outside, and displaying on said display portion an image of a display area which is at least a part of said acquired content,
said browsing step including
- a display area determining step of determining said display area on a basis of the gesture event determined by said gesture event determining portion,
- a capture area determining step of determining a capture area including the display area determined in said display area determining step,
- a captured image generating step of, in response to determination of said capture area, generating a captured image corresponding to said determined capture area on a basis of said acquired content, a temporary memory control step of temporarily storing said generated captured image, a display image generating step of generating a display image corresponding to said determined display area on a basis of said temporarily stored captured image, and a display control step of displaying said generated display image on said display portion.

15. A non-transitory computer-readable recording medium encoded with the browsing program performed by a computer which controls the data processing apparatus, wherein said browsing program causes said computer to execute each of the steps included in the content displaying method recited in claim 14.

16. The content displaying method according to claim 14, wherein in a case where a gesture period in which gesture events are determined continuously by said gesture event determining portion terminates, said capture area determining step includes a step of determining the capture area including the display area determined in said display area determining step, and during another gesture period next to said gesture period, said display image generating step includes a step of generating the display image on a basis of the captured image corresponding to the capture area determined in a case where said gesture period terminates.

17. A content displaying method performed by a data processing apparatus, said data processing apparatus including a display portion capable of displaying an image, a position detecting portion capable of detecting one or more positions designated by a user on a display surface of said display portion, and a gesture event determining portion operable, in response to detection of the one or more positions by said position detecting portion, to determine one gesture event of a plurality of gesture events on a basis of said one or more positions, the method causing said data processing apparatus to perform a browsing step of executing a browsing program and displaying on said display portion at least a part of externally stored content, said browsing step including a display area determining step of determining a part of said externally stored content as a display area on a basis of the gesture event determined by said gesture event determining portion, a capture area determining step of, at a time point prior to acquisition of the part of said externally stored content, determining a capture area including the display area determined in said display area determining step, a captured image acquiring step of, in response to determination of said capture area, acquiring a captured image corresponding to said determined capture area from said externally stored content, a temporary memory control step of temporarily storing said acquired captured image, a display image generating step of, during a gesture period in which gesture events are determined continuously by said gesture event determining portion, generating a display image corresponding to said determined display area on a basis of said temporarily stored captured image, and a display control step of displaying said generated display image on said display portion.

18. A non-transitory computer-readable recording medium encoded with the browsing program performed by a computer which controls the data processing apparatus, wherein said browsing program causes said computer to execute each of the steps included in the content displaying method recited in claim 17.

19. The content displaying method according to claim 17, wherein in a case where the gesture period in which the gesture events are determined continuously by said gesture event determining portion terminates, said capture area determining step includes a step of determining the capture area including the display area determined in said display area determining step, and during another gesture period next to said gesture period, said display image generating step includes a step of generating the display image on a basis of the captured image corresponding to the capture area determined in a case where said gesture period terminates.

* * * * *